US010319060B2

(12) United States Patent
Rao et al.

(10) Patent No.: US 10,319,060 B2
(45) Date of Patent: Jun. 11, 2019

(54) UNIFIED MEMORY SYSTEMS AND METHODS

(71) Applicant: Nvidia Corporation, Santa Clara, CA (US)

(72) Inventors: Amit Rao, Bangalore (IN); Ashish Srivastava, Bangalore (IN); Yogesh Kini, Bangalore (IN)

(73) Assignee: Nvidia Corporation, Santa Clara, CA (US)

( * ) Notice: Subject to any disclaimer, the term of this patent is extended or adjusted under 35 U.S.C. 154(b) by 0 days.

(21) Appl. No.: 14/601,223

(22) Filed: Jan. 20, 2015

(65) Prior Publication Data

US 2015/0206277 A1    Jul. 23, 2015

Related U.S. Application Data

(63) Continuation of application No. 14/481,802, filed on Sep. 9, 2014, now Pat. No. 9,886,736.

(60) Provisional application No. 61/929,496, filed on Jan. 20, 2014, provisional application No. 61/965,089, filed on Jan. 21, 2014, provisional application No. 61/929,913, filed on Jan. 21, 2014.

(51) Int. Cl.
| | |
|---|---|
| *G06F 13/14* | (2006.01) |
| *G06T 1/20* | (2006.01) |
| *G06F 12/109* | (2016.01) |
| *G06T 1/60* | (2006.01) |
| *G06F 9/50* | (2006.01) |

(52) U.S. Cl.
CPC .............. *G06T 1/20* (2013.01); *G06F 9/5016* (2013.01); *G06F 12/109* (2013.01); *G06T 1/60* (2013.01)

(58) Field of Classification Search
CPC .......... G06F 3/14; G09G 5/363; G09G 5/006; G09G 5/001; G06T 1/20
USPC ......................................................... 345/520
See application file for complete search history.

(56) References Cited

U.S. PATENT DOCUMENTS

| | | |
|---|---|---|
| 5,765,036 A | 6/1998 | Lim |
| 6,324,683 B1 | 11/2001 | Fuh et al. |
| 6,571,320 B1 | 5/2003 | Hachmann |
| 7,065,630 B1 | 6/2006 | Ledebohm et al. |
| 7,366,956 B2 | 4/2008 | Karp et al. |
| 7,516,446 B2 | 4/2009 | Choi et al. |
| 7,549,150 B2 | 6/2009 | Yu |

(Continued)

FOREIGN PATENT DOCUMENTS

WO    WO20060-115769    11/2006

OTHER PUBLICATIONS

"Memory Management" (by WordPress in 2008).*

(Continued)

*Primary Examiner* — Gordon G Liu
(74) *Attorney, Agent, or Firm* — Hogan Lovells US LLP

(57) ABSTRACT

The present invention facilitates efficient and effective utilization of unified virtual addresses across multiple components. In one embodiment, the presented new approach or solution uses Operating System (OS) allocation on the central processing unit (CPU) combined with graphics processing unit (GPU) driver mappings to provide a unified virtual address (VA) across both GPU and CPU. The new approach helps ensure that a GPU VA pointer does not collide with a CPU pointer provided by OS CPU allocation (e.g., like one returned by "malloc" C runtime API, etc.).

20 Claims, 17 Drawing Sheets

(56) References Cited

U.S. PATENT DOCUMENTS

| | | |
|---|---|---|
| 7,584,332 B2 | 9/2009 | Kogge et al. |
| 7,673,181 B1 | 3/2010 | Lindo et al. |
| 7,757,237 B2 | 7/2010 | Karp et al. |
| 7,992,146 B2 | 8/2011 | Krauss |
| 8,028,133 B2 | 9/2011 | Dice et al. |
| 8,095,750 B2 | 1/2012 | Heller, Jr. |
| 8,117,403 B2 | 2/2012 | Heller, Jr. et al. |
| 8,296,743 B2 | 10/2012 | Linderman |
| 8,321,637 B2 | 11/2012 | Baum et al. |
| 8,375,368 B2 | 2/2013 | Tuck |
| 8,448,156 B2 | 5/2013 | Demetriou et al. |
| 8,487,946 B2 | 7/2013 | Stauffer et al. |
| 9,547,535 B1* | 1/2017 | Wilt ............... G06F 9/544 |
| 9,563,571 B2* | 2/2017 | Kumar ........... G06F 12/1009 |
| 9,619,364 B2 | 4/2017 | Venkataraman |
| 2003/0131283 A1 | 7/2003 | Ur et al. |
| 2003/0210248 A1* | 11/2003 | Wyatt ............ G06F 12/0888 345/541 |
| 2004/0160449 A1* | 8/2004 | Gossalia ............ G06F 3/14 345/543 |
| 2005/0273570 A1 | 12/2005 | DeSouter et al. |
| 2005/0283781 A1 | 12/2005 | Karp et al. |
| 2006/0218553 A1 | 9/2006 | Dore et al. |
| 2006/0224858 A1 | 10/2006 | Wang et al. |
| 2006/0259691 A1 | 11/2006 | Jeremiassen |
| 2006/0267990 A1* | 11/2006 | Rogers ............... G06T 1/20 345/502 |
| 2007/0011671 A1 | 1/2007 | Kahlon et al. |
| 2008/0028181 A1 | 1/2008 | Tong et al. |
| 2008/0312095 A1 | 12/2008 | Kirovski et al. |
| 2010/0118041 A1 | 5/2010 | Chen et al. |
| 2010/0138376 A1 | 6/2010 | Avis et al. |
| 2010/0153934 A1 | 6/2010 | Lachner |
| 2010/0250809 A1 | 9/2010 | Ramesh et al. |
| 2011/0078427 A1 | 3/2011 | Shebanow et al. |
| 2011/0161619 A1 | 6/2011 | Kaminski et al. |
| 2011/0167412 A1 | 7/2011 | Kahlon et al. |
| 2011/0185359 A1 | 7/2011 | Chakrabarti |
| 2011/0314458 A1 | 12/2011 | Zhe et al. |
| 2012/0198178 A1 | 8/2012 | Cox et al. |
| 2012/0254497 A1 | 10/2012 | Ni et al. |
| 2013/0036408 A1 | 2/2013 | Auerbach et al. |
| 2013/0086564 A1 | 4/2013 | Felch |
| 2013/0262784 A1* | 10/2013 | Asaro ............ G06F 12/0284 711/147 |
| 2013/0304996 A1 | 11/2013 | Venkataraman et al. |
| 2013/0305252 A1 | 11/2013 | Venkataraman et al. |
| 2014/0049551 A1* | 2/2014 | Rao ............... G06T 11/60 345/543 |
| 2015/0206272 A1 | 7/2015 | Perelygin et al. |
| 2016/0011857 A1 | 1/2016 | Grover et al. |
| 2016/0188251 A1 | 6/2016 | Dunning et al. |

OTHER PUBLICATIONS

Ueng, et al., "CUDA-Lite: Reducing GPU programming complexity." Journal (2008) vol. (5335); pp. 10-24. Springer-Verlag Berlin Heidelberg.

Artho, Cyrille, et al., "Using Block-Local Atomicity to Detect Stale-Value Concurrency Errors," ATVA 2004, Oct. 31-Nov. 3, 2004, pp. 150-164.

Butelle, Franck, et al. "A Model for Coherent Distributed Memory for Race Condition Detection," 2011 IEEE IPDPS, May 16-20, 2011, pp. 584-590.

Higuera-Toledano, M. T., "Towards an Analysis of Race Carrier Conditions in Real-time Java," 2006 IEEE, Apr. 25-29, 2006, pp. 1-7.

Sathiyamurthy, K., et al., "Automated Reasoning Tool for the Detection of Race Conditions in Web Services," 2007 IEEE ICCIMA, Dec. 13-15, 2007, pp. 61-65.

Bergan, Tom, et al., "CoreDet: A Compiler and Runtime System for Deterministic Multithreaded Execution," ASPLOS 2010, Mar. 13-17, 2010, pp. 53-64.

Prvulovic, Milos, "CORD: Cost-effective (and nearly overhead-free) Order-Recording and Data Race Detection," 12th HPCA, Feb. 2006, pp. 1-12.

Flanagan, Cormac, et al., "FastTrack: Efficient and Precise Dynamic Race Detection," Communications of the ACM, vol. 53, No. 11, pp. 93-101.

* cited by examiner

1300

```
1310
Perform memory allocation process
  (e.g., make CudaMalloc call,
         allocate memory on GPU
         allocate memory on CPU
            (physical pages)
         map into CPU PA space)
```

```
1320
Perform temporary isolation process (e.g. to prevent user from reading inappropriately
break CPU VA to CPU PA link)
```

```
1330
Perform update process
(e.g., copy data from CPU PA to GPU (to give GPU
current/coherent contents)
```

Perform process to establish managed memory associated with a single pointer.

1420

Perform process of automatically managing access associated with the pointer across various processors and memories.

FIG 14

$$\begin{vmatrix} A \\ K_0 \\ K_1 \\ \vdots \\ K_2 \end{vmatrix} \quad \begin{vmatrix} B \\ K_3 \\ K_4 \\ \vdots \\ K_5 \end{vmatrix}$$

UNIFIED MEMORY SYSTEMS AND METHODS

RELATED APPLICATIONS

This application claims the benefit of and priority to:
provisional application 61/929,496 entitled "Unified Memory Systems and Methods" filed Jan. 20, 2014;
provisional application 61/965,089 entitled "Unified Memory Systems and Methods" filed Jan. 21, 2014; and
provisional application 61/929,913 entitled "Inline Parallelism and Re-targetable Parallel Algorithms" filed Jan. 21, 2014;
which are all incorporated herein by reference.

This application is a continuation-in-part of and also claims benefit of and priority to application Ser. No. 14/481,802 entitled "Selectively Killing Trapped Multi-Purpose Service Clients Sharing The Same Hardware Context" filed on Feb. 9, 2014.

FIELD OF THE INVENTION

The present invention relates to the field of memory configuration. In one embodiment, virtual addressing associated with unified memory is implemented with pointer collision avoidance or mitigation.

BACKGROUND OF THE INVENTION

Electronic systems and devices have made a significant contribution towards the advancement of modern society and are utilized in a number of applications to achieve advantageous results. Numerous electronic technologies such as digital computers, calculators, audio devices, video equipment, and telephone systems have facilitated increased productivity and reduced costs in analyzing and communicating data in most areas of business, science, education and entertainment. These electronic systems typically include numerous different components and can often attempt to provide various capabilities. However, adding various capabilities to a complex system can be complicated and traditional attempts at implementing various features (e.g., conventional attempts at utilizing virtual addresses across various components of a system, etc.) can have undesirable impacts.

Various systems (e.g. systems with discrete components, modern System On Chips (SOC's), etc.) typically have various different components that need access to memory to implement their desired functionality or operations. Many computing systems often have a central processing unit (CPU), a graphics processing unit (GPU), memory controller, and other peripheral controllers that can be on the same chip or separate discrete components. Both the GPU and the CPU often attempt to access the same physical dynamic random access memory (DRAM). However, typically the CPU has its own memory management unit (MMU) that the operating system (OS) sets up while the GPU has its own MMU that the GPU driver sets up. This potentially leads to a scenario where there are two distinct address spaces, one that is setup by the OS for the CPU and the other that is setup by the GPU driver for the GPU. These are often distinct virtual address (VA) spaces setup by different software components and can potentially lead to pointer collision or overlap. It is usually difficult to determine if a given particular virtual address (e.g., associated with a pointer, etc.) belongs to the CPU VA space, GPU VA space, or both. Some traditional attempts at resolving these issues are directed at having applications try to explicitly track which VA space a pointer belongs to.

The various conventional approaches that attempt to handle virtual addresses and pointer tracking typically have a number of problems. In some systems (e.g., on a 64 bit CPU, etc.) the VA space can be considered relatively large. Some traditional approaches attempt to reserve a large CPU VA chunk from the OS and have the GPU driver allocate only in this VA range. However, this approach often has a number of drawbacks including possible waste of CPU VA space if a large chunk is reserved initially but the actual amount of space that is required or utilized is much less. In some systems (e.g., on 32 bit CPU, etc.) the VA space can be considered relatively small. Given the total CPU VA space available is relatively small, reserving large chunks of CPU VA space for the GPU can result in less or inadequate VA space remaining available for operations of the other components (e.g., CPU, etc.) and can lead to lower system utilization.

SUMMARY

The present invention facilitates efficient and effective utilization of unified virtual addresses across multiple components. In one embodiment, the presented new approach or solution uses Operating System (OS) allocation on the central processing unit (CPU) combined with graphics processing unit (GPU) driver mappings to provide a unified virtual address (VA) across both GPU and CPU. The new approach helps ensure that a GPU VA pointer does not collide with a CPU pointer provided by OS CPU allocation (e.g., like one returned by "malloc" C runtime API, etc.). In one exemplary implementation, an address allocation process comprises: allocating physical memory pages to a second component (e.g., GPU, etc.); allocating a virtual address associated with a first component (e.g., CPU, etc.); and mapping the allocated physical pages to the virtual address allocated in association with the first component, wherein the mapping of the virtual address allocated in association with the first component is performed by an element associated with the second component. The operating system function can be used to allocate the physical memory pages, wherein actual physical pages associated with the first component are not allocated. In an implementation where the second component is a GPU, the mapping can be done via the GPU driver (e.g., the GPU diver maps a virtual address allocated to a CPU, etc.). In one embodiment, the virtual address allocated to the first component is returned to the user.

DESCRIPTION OF THE DRAWINGS

The accompanying drawings, which are incorporated in and form a part of this specification, are included for exemplary illustration of the principles of the present invention and not intended to limit the present invention to the particular implementations illustrated therein. The drawings are not to scale unless otherwise specifically indicated.

FIG. 13 is a flow chart of an exemplary method in accordance with one embodiment of the present invention.

FIG. 14 is a flow chart of an exemplary method.

DETAILED DESCRIPTION

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one ordinarily skilled in the art that the present invention may be practiced without these specific details. In other instances, well known methods, procedures, components, and circuits have not been described in detail as not to unnecessarily obscure aspects of the current invention.

The new approach or scheme can facilitate efficient utilization of unified virtual addresses across multiple components. The presented new approach or solution uses OS allocation on the CPU combined with GPU driver mappings to provide a unified VA across both GPU and CPU. The new approach helps ensure that a GPU VA pointer does not collide with a CPU pointer provided by OS CPU allocation (e.g., like one returned by "malloc" C runtime API, etc.).

Figure 1:
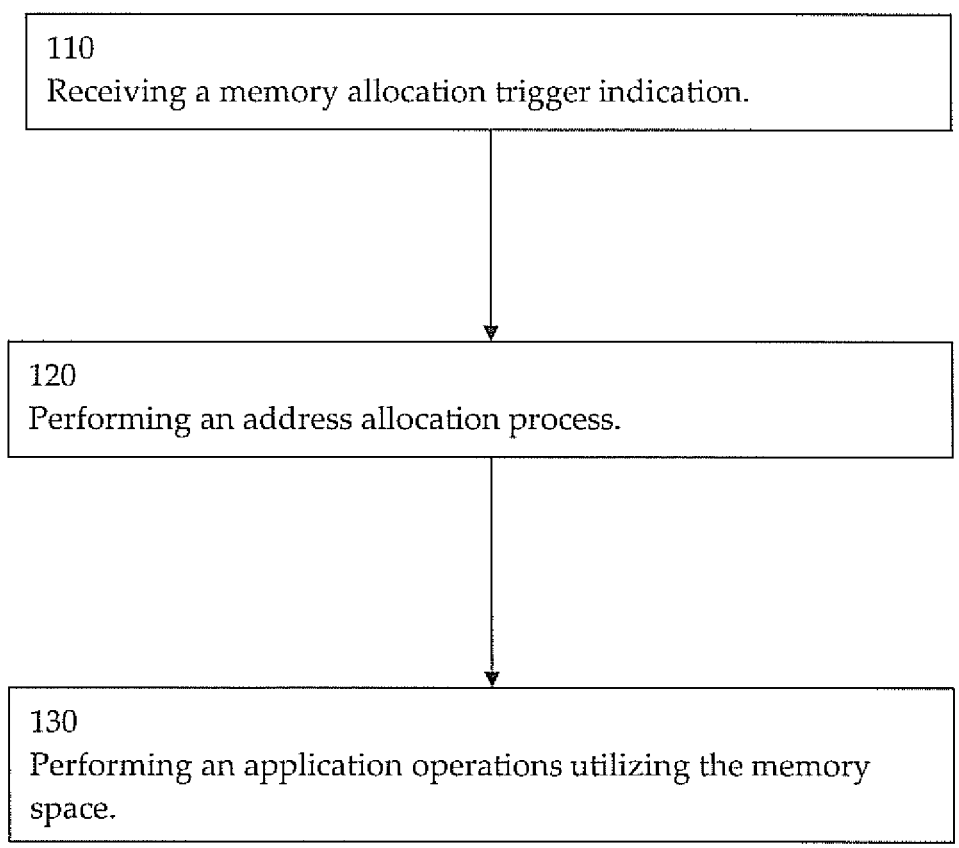
FIG. 1 is a flow chart of an exemplary unified memory coordination method in accordance with one embodiment of the present invention.

FIG. 1 is a flow chart of an exemplary unified memory coordination method 100 in accordance with one embodiment of the present invention.

In block 110, a memory allocation trigger indication is received. In one embodiment, the allocation trigger is associated with a unified memory virtual address allocation. The present approach is compatible with a variety of triggers. The trigger indications can result from whenever a user requests a GPU allocation, an OS API initiates allocation of GPU accessible memory, or through an application program interface (API) (e.g., like cudaMalloc, etc.).

In block 120, an address allocation process is performed. In one embodiment, the address allocation process facilitates or enables pointer collision avoidance in a unified memory virtual address scheme. In one exemplary implementation, pointers associated with a GPU operation directed to a unified virtual address space do not collide with pointers associated with a CPU operation directed to the unified virtual address space.

In block 130, application operations utilizing the memory space are performed. In one embodiment, the application operations are performed by a GPU and a CPU. In one exemplary implementation, the operations are directed to portions of the unified virtual address space.

Figure 2:
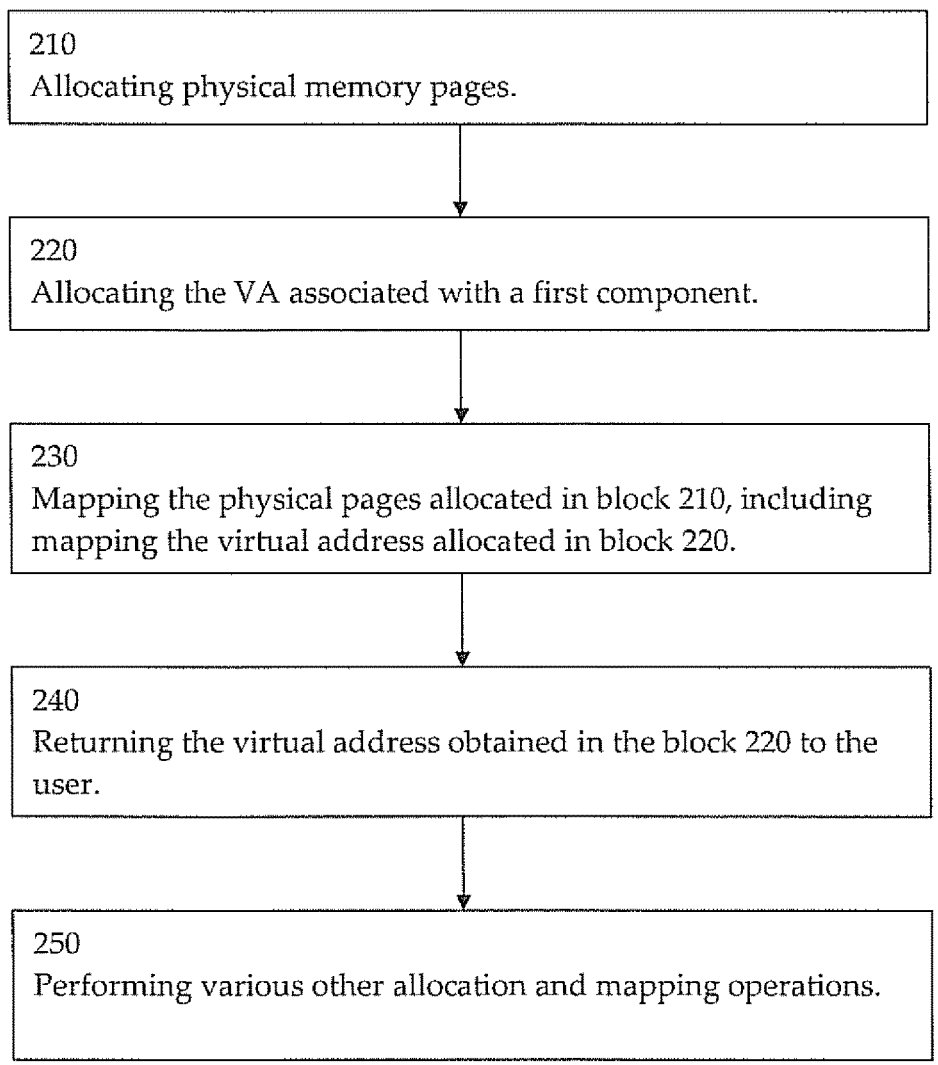
FIG. 2 is a flow chart of an exemplary address allocation process with pointer collision avoidance in accordance with one embodiment of the present invention.

FIG. 2 is a flow chart of an exemplary address allocation process 200 with pointer collision avoidance in accordance with one embodiment of the present invention. In one embodiment, the address allocation process 200 is performed in a unified memory virtual address scheme.

In block 210, physical memory pages are allocated. In one embodiment, an OS function is used to allocate the physical memory pages.

In block 220, a VA associated with a first component is allocated. In one embodiment, the actual physical pages are not allocated. In one exemplary implementation, the first component is a CPU and only the CPU virtual address is allocated. The allocation scheme can be accomplished by a variety of mechanisms. The allocation can be done using a C function (e.g., like mmap with MAP_ANONYMOUS flag, etc.). The VA for the CPU is tracked or recorded (e.g., record the VA returned by the mmap function, etc.).

In block 230, the physical pages allocated in block 210 are mapped. In one embodiment, the physical pages allocated in block 210 are mapped to a second component. In one exemplary implementation, the second component is a GPU. The mapping can be done by a variety of mechanisms. The mapping can be done via the GPU driver. The GPU driver is capable of mapping the physical pages to requested GPU VA. The mapping can include the virtual address allocated in block 220. In one embodiment, a virtual address allocated in block 220 to the first component is mapped to a VA address by an element associated with the second component. In one exemplary implementation, a request can be made for the GPU diver to map to the VA returned in block 220 (e.g., a VA allocated to the CPU, etc.).

In block 240, the VA obtained in the block 220 is returned to the user.

In block 250, various other allocation and mapping operations are optionally performed. The additional allocation and mappings can include allocation and mapping of GPU VA to GPU PA and CPU VA to CPU PA. It is appreciated that the present approach is compatible with a variety of implementations and configurations. In one embodiment, the approach keeps the CPU VA space and GPU VA space disjoint. In another embodiment, the CPU VA space and GPU VA space can overlap.

A GPU virtual address collision with the CPU virtual address can be reduced or eliminated by the novel allocation schemes. In one embodiment, the approach (e.g., the operations in block 220, etc.) can help ensure that an OS cannot make another CPU allocation for a current process with a VA it has returned (e.g., the operations in block 240, etc.). It is essentially blocking the VA chunk on the CPU. In one exemplary implementation, this VA chunk can be used to map the physical pages to this VA on GPU.

In one exemplary implementation, if the GPU VA mapping fails (e.g., because the VA address was allocated by a GPU for some internal purposes, etc.) then the approach can go back (e.g., to block 220, etc.) and reallocates a new CPU VA (e.g., through mmap and MAP_ANONYMOUS, etc.), then frees the previous VA.

In one embodiment, the allocator maintains an internal heap of the VA address ranges it has reserved on the CPU (e.g., using mmap in block 210, etc.). This heap represents the GPU allocations. Now given a VA pointer, the allocator or the runtime can determine if this is a GPU allocation or a CPU allocation by looking up the heap.

Figure 3:
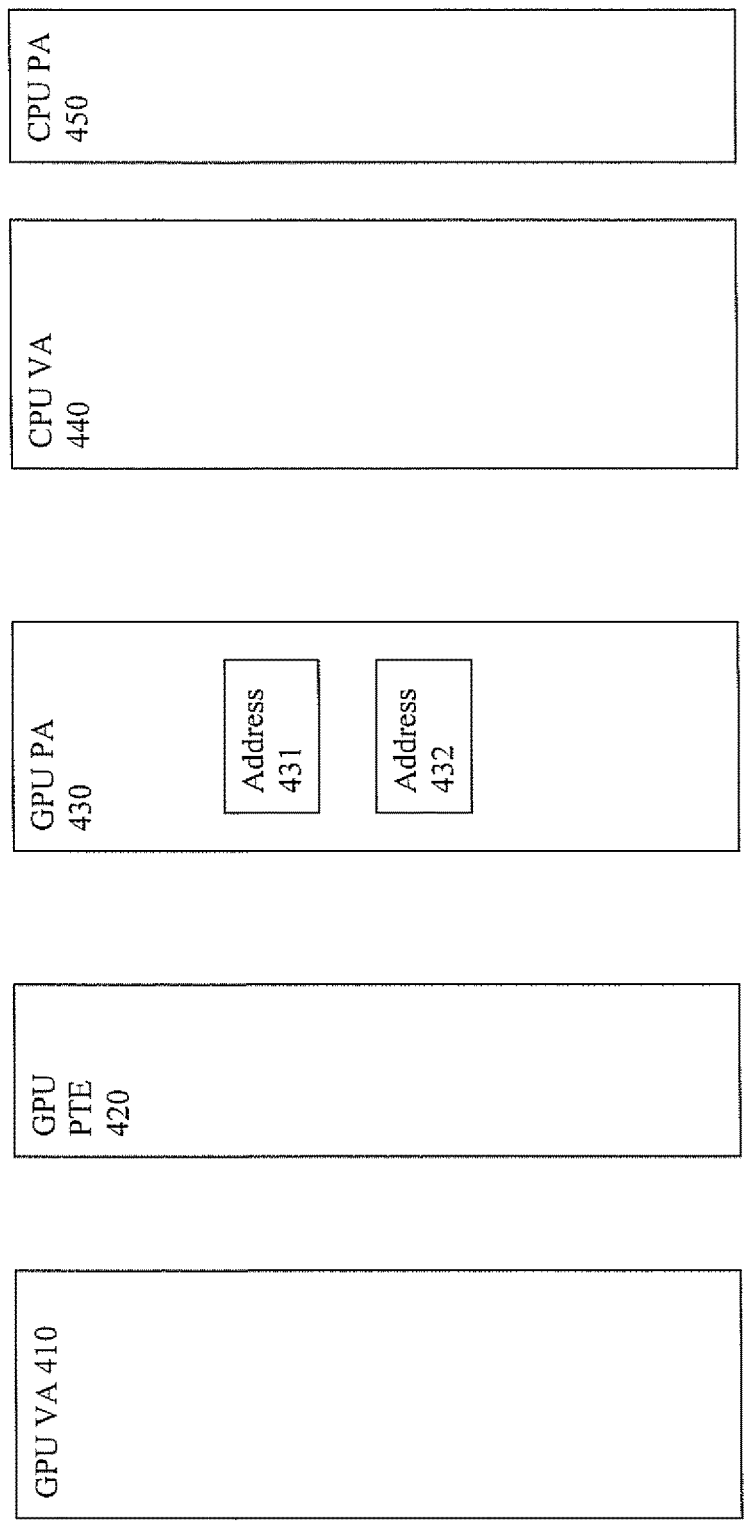
FIG. 3 is a block diagram of an exemplary unified memory system with at least some physical addresses allocated in accordance with one embodiment of the present invention.

FIG. 3 is a block diagram of an exemplary unified memory system with at least some physical addresses allocated in accordance with one embodiment of the present invention. The unified memory system includes graphics processing unit virtual address space (GPU VA) 410, graphics processing unit page table (GPU PTE) 420, graphics processing unit physical address space (GPU PA) 430, central processing unit virtual address space (CPU VA) 440 and central processing physical address space (GPU PA) 450. Physical address 431 and 432 have been reserved or allocated for Virtual Address activity (e.g., similar to operations in block 210).

Figure 4:
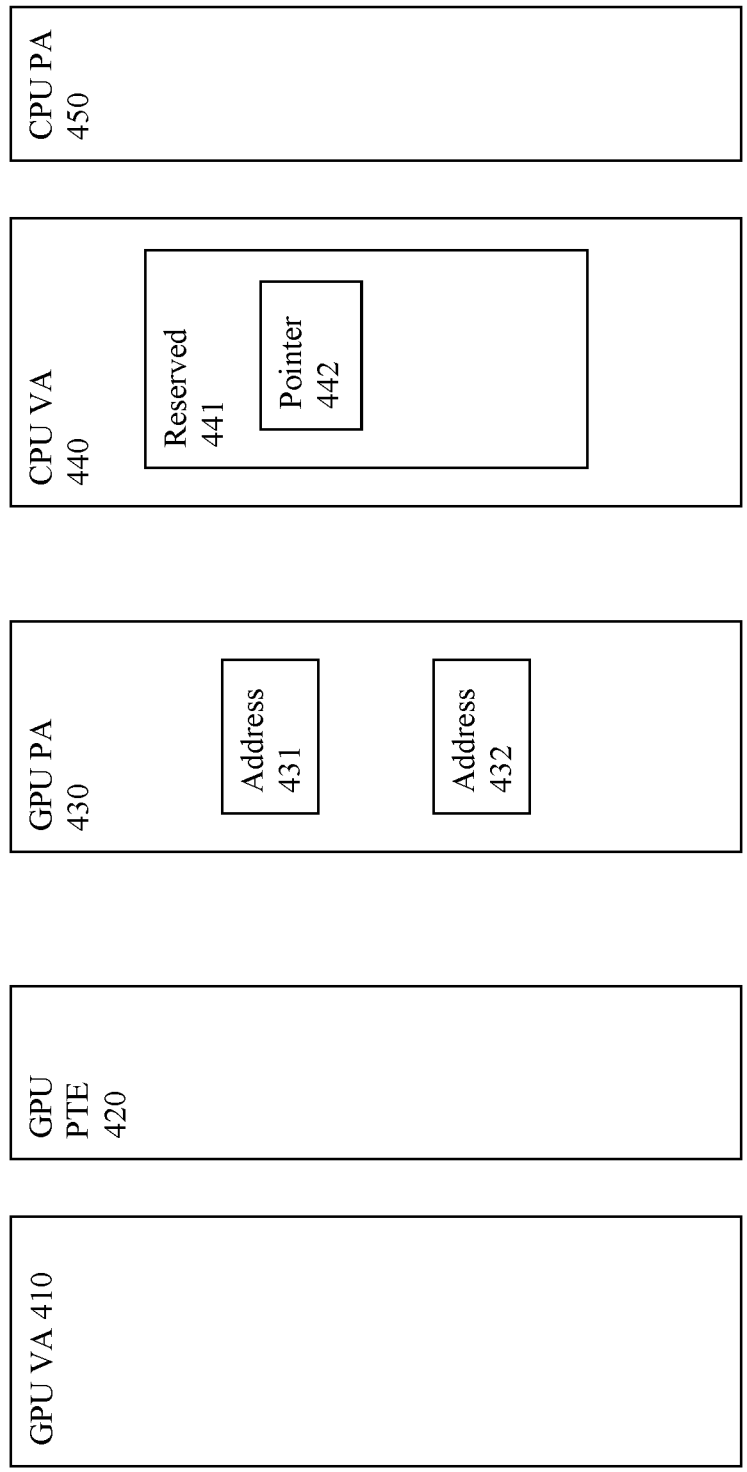
FIG. 4 is a block diagram of an exemplary unified memory system with at least some virtual addresses allocated in accordance with one embodiment of the present invention.

FIG. 4 is a block diagram of an exemplary unified memory system with at least some virtual addresses allocated in accordance with one embodiment of the present invention. In one embodiment, virtual address space 441 is reserved or allocated for unified VA memory operations (e.g., similar to operations in block 220). Address space 441 includes an address associated with pointer 442.

Figure 5:
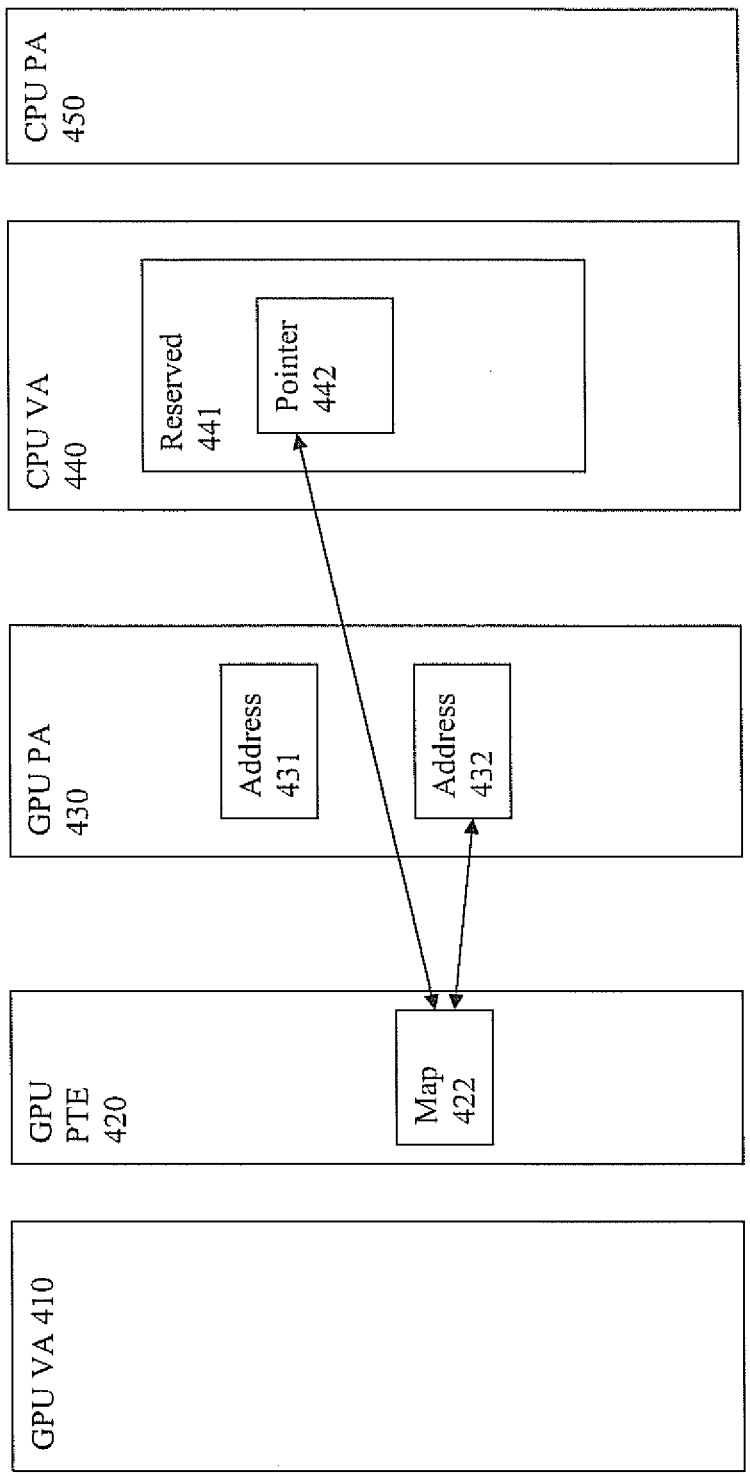
FIG. 5 is a block diagram of an exemplary unified memory system with unified memory virtual addresses allocated in accordance with one embodiment of the present invention.

FIG. 5 is a block diagram of an exemplary unified memory system with unified memory virtual addresses allocated in accordance with one embodiment of the present invention. In one embodiment, virtual address space 441 (including address space associated with pointer 442) is mapped via GPU PTE 420 mapping indication 422 to GPU PA 430 physical address space 432 (e.g., similar to operations in block 230).

Figure 6:
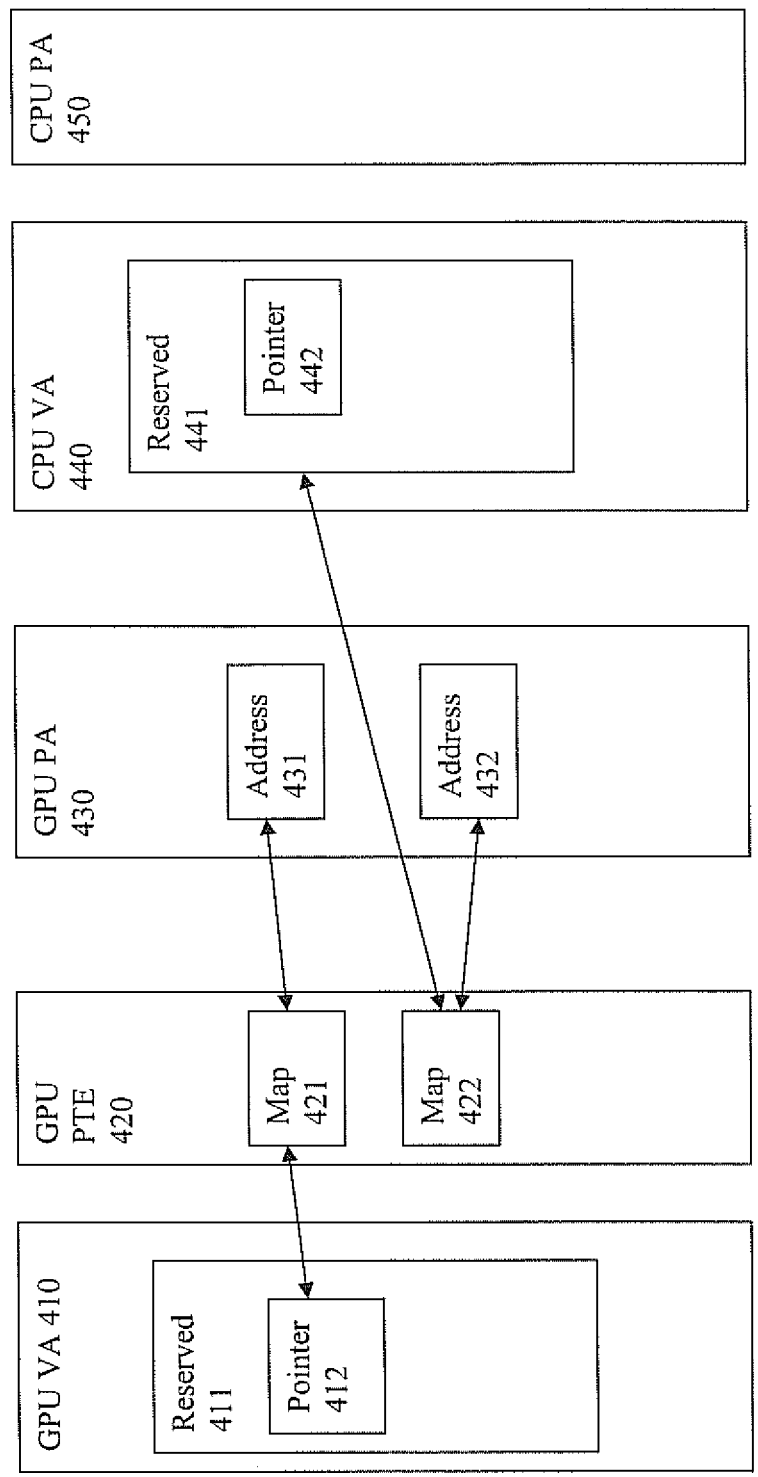
FIG. 6 is a block diagram of an exemplary unified memory system with additional unified memory virtual addresses allocated in accordance with one embodiment of the present invention.

FIG. 6 is a block diagram of an exemplary unified memory system with additional unified memory virtual addresses allocated in accordance with one embodiment of the present invention. In one embodiment, virtual address space 411 including address space associated with pointer 412 is mapped via GPU PTE 420 mapping indication 421 to GPU PA 430 physical address space 431.

Figure 7:
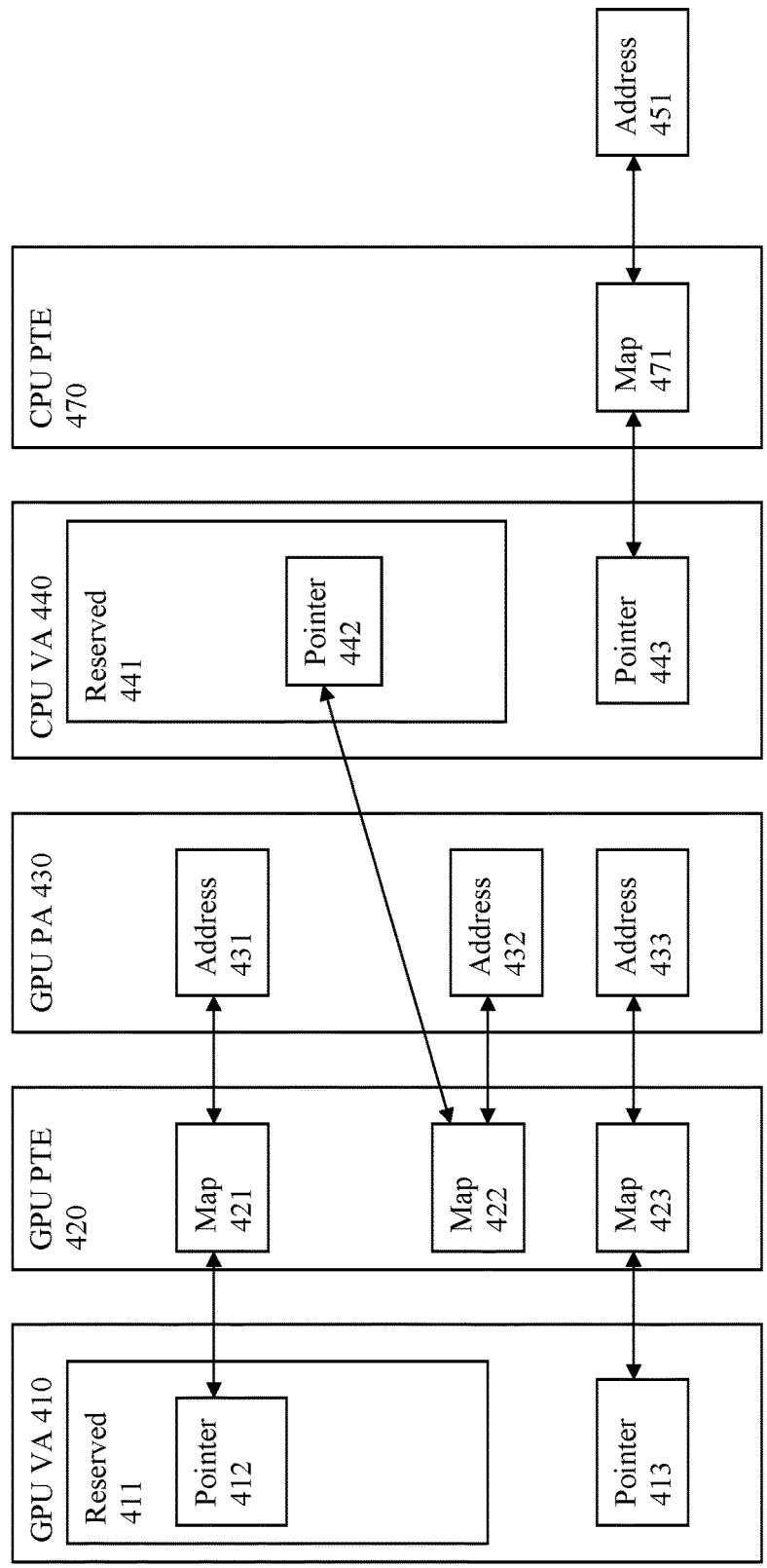
FIG. 7 is a block diagram of an exemplary unified memory system with yet even more additional unified memory virtual addresses allocated in accordance with one embodiment of the present invention.

FIG. 7 is a block diagram of an exemplary unified memory system with yet even additional unified memory virtual addresses allocated in accordance with one embodiment of the present invention. Virtual addresses associated with the GPU can be mapped to the GPU PA. In one embodiment, GPU VA 410 allocated space 411 (including an address associated with pointer 412) is mapped to GPU PA 430 address 431 via GPU PTE 420 mapping entry or indication 421. The GPU VA 410 address associated with pointer 413 is mapped to GPU PA 430 address 433 via GPU PTE 420 mapping entry or indication 423. Virtual addresses associated with the CPU can be mapped to the CPU PA. The CPU VA 440 address associated with pointer 433 is mapped to CPU PA 450 address 451 via CPU PTE 470 mapping entry or indication 471. In one exemplary implementation, with a joint VA the reserved VA 411 and reserved 441 spaces include the same virtual addresses. In another exemplary implementation, with a disjoint VA the reserved VA 411 and reserved 441 spaces do not include the same virtual addresses.

Figure 8:
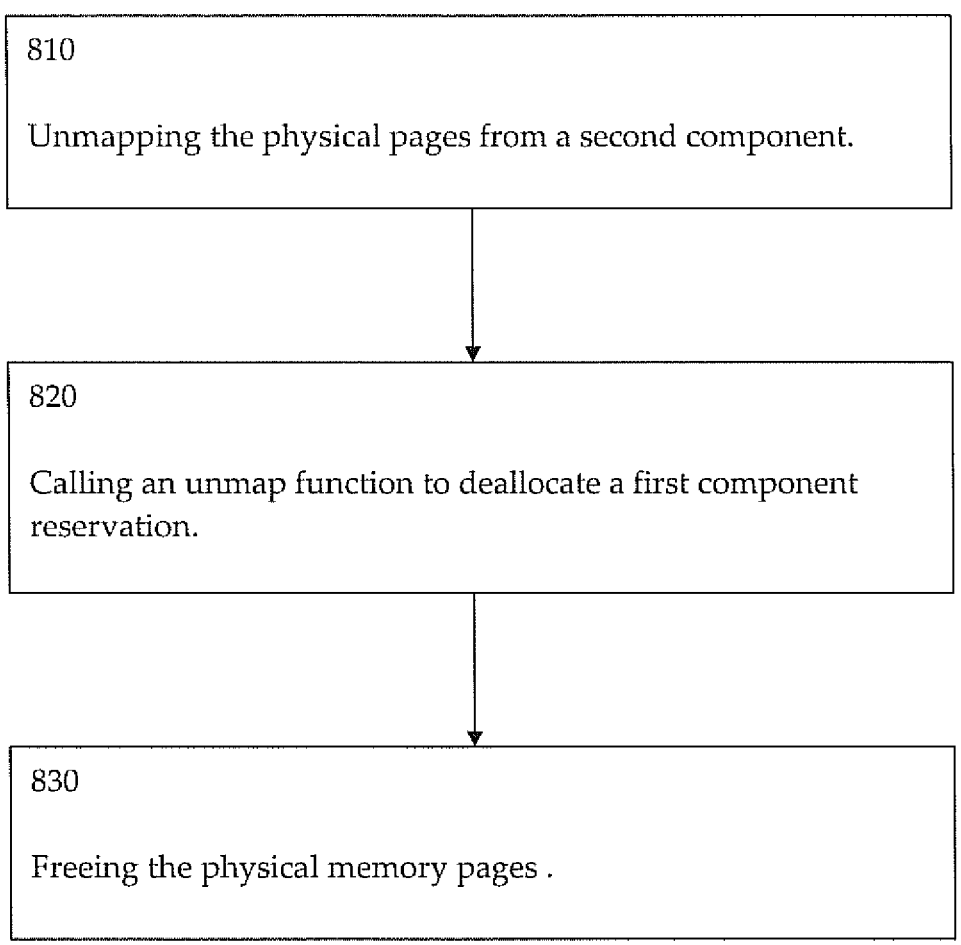
FIG. 8 is a flow chart of an exemplary deallocate process in accordance with one embodiment of the present invention.

In one embodiment, a free/deallocate process can be performed. FIG. 8 is a flow chart of an exemplary deallocate process 800 in accordance with one embodiment of the present invention.

In block 810, the physical pages are unmapped from a second component. In one embodiment, the second component is a GPU. In one exemplary implementation, the pages are unmapped using the GPU driver.

In block 820, a call to the an unmap function (e.g., munmap, etc.) is made to deallocate a first component reservation. In one embodiment, a call deallocates a CPU VA reservation.

In block 830, the physical memory pages are freed. The physical memory pages can be reallocated in accordance with process 200.

It is appreciated that this description includes some exemplary embodiments and other embodiments can also be utilized to implement the novel memory allocation approach or scheme. The new approach can be implemented in various systems and components with different configurations. The components can be included in a system on a chip (e.g., multiple processing components, processing engines, etc.). The components can also be discrete separate components.

Figure 9:
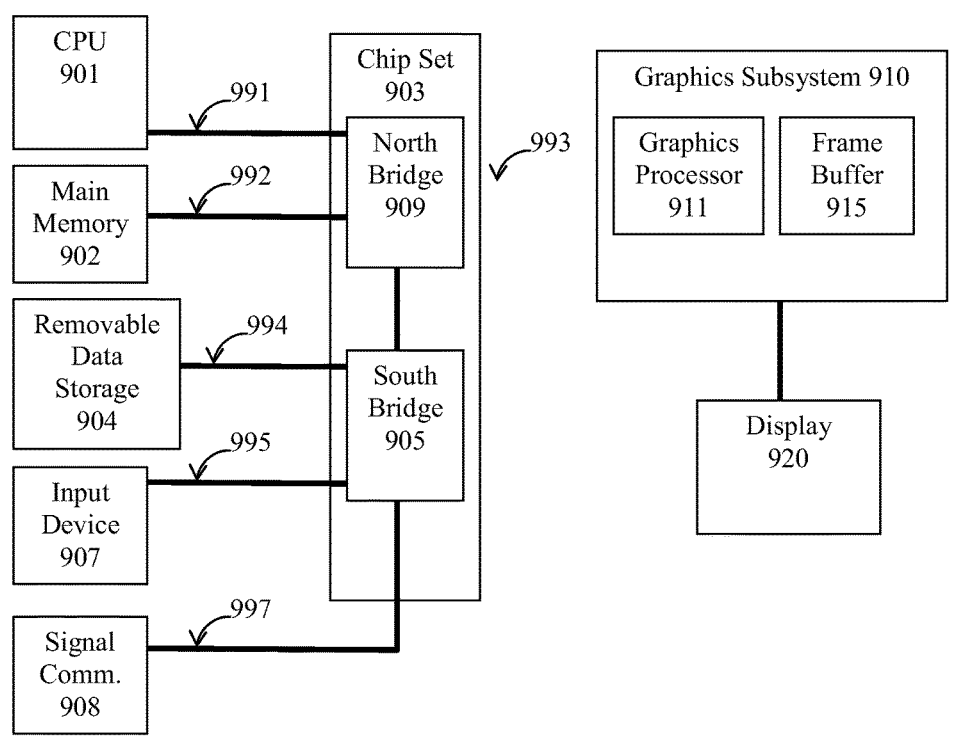
FIG. 9 is a block diagram of an exemplary computer system upon which embodiments of the present invention can be implemented.

With reference to FIG. 9, a block diagram of an exemplary computer system 900 is shown, one embodiment of a computer system upon which embodiments of the present invention can be implemented. Computer system 900 includes central processor unit 901, main memory 902 (e.g., random access memory), chip set 903 with north bridge 909 and south bridge 905, removable data storage device 904, input device 907, signal communications port 908, and graphics subsystem 910 which is coupled to display 920. Computer system 900 includes several busses for communicatively coupling the components of computer system 900. Communication bus 991 (e.g., a front side bus) couples north bridge 909 of chipset 903 to central processor unit 901. Communication bus 992 (e.g., a main memory bus) couples north bridge 909 of chipset 903 to main memory 902. Communication bus 993 (e.g., the Advanced Graphics Port interface) couples north bridge of chipset 903 to graphic subsystem 910. Communication buses 994, 995 and 997 (e.g., a PCI bus) couple south bridge 905 of chip set 903 to removable data storage device 904, input device 907, signal communications port 908 respectively. Graphics subsystem 910 includes graphics processor 911 and frame buffer 915.

The components of computer system 900 cooperatively operate to provide versatile functionality and performance. In one exemplary implementation, the components of computer system 900 cooperatively operate to provide predetermined types of functionality. Communications bus 991, 992, 993, 994, 995 and 997 communicate information. Central processor 901 processes information. Main memory 902 stores information and instructions for the central processor 901. Removable data storage device 904 also stores information and instructions (e.g., functioning as a large information reservoir). Input device 907 provides a mechanism for inputting information and/or for pointing to or highlighting information on display 920. Signal communication port 908 provides a communication interface to exterior devices (e.g., an interface with a network). Display device 920 displays information in accordance with data stored in frame buffer 915. Graphics processor 911 processes graphics commands from central processor 901 and provides the resulting data to video buffers 915 for storage and retrieval by display monitor 920.

Figure 10:
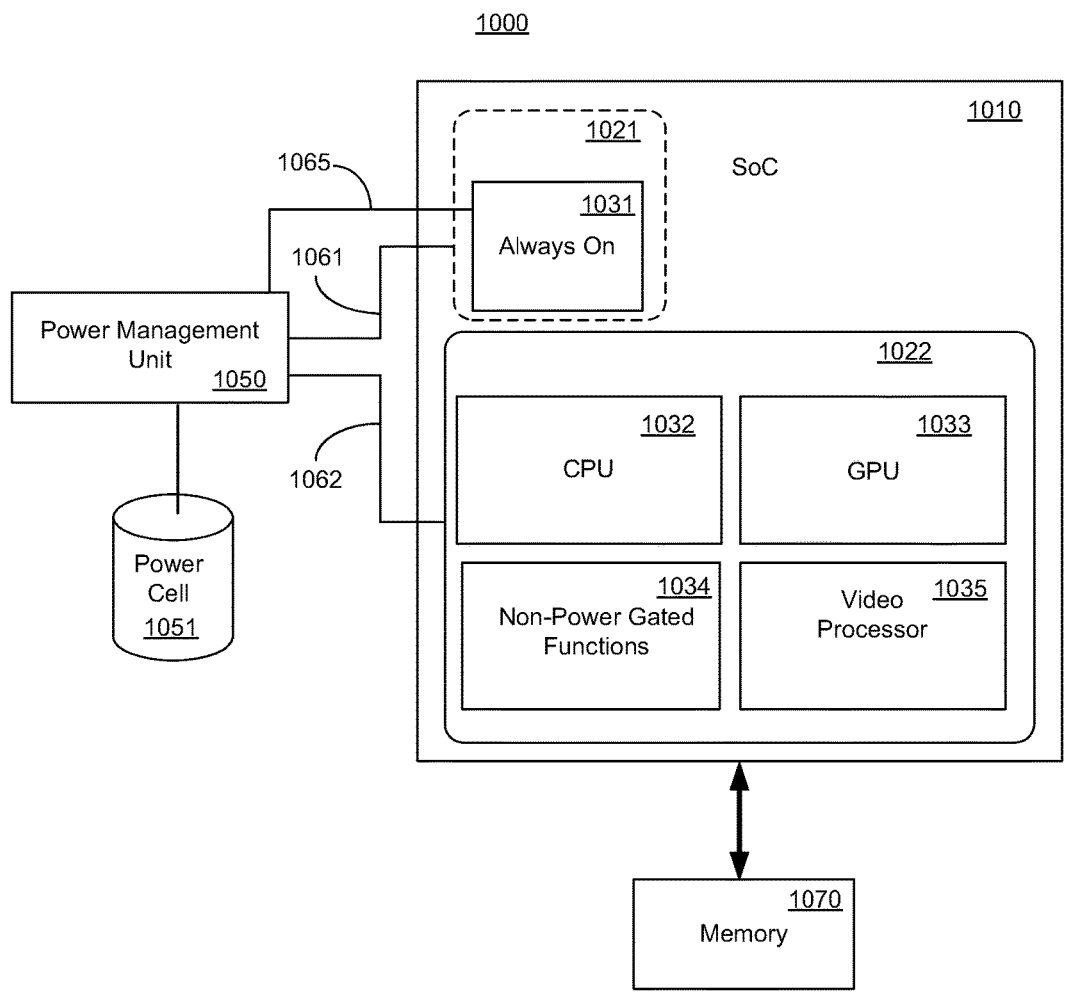
FIG. 10 shows another exemplary architecture that incorporates an exemplary video processor or graphics processor in accordance with one embodiment of the present invention.

FIG. 10 shows another exemplary architecture that incorporates an exemplary video processor or graphics processor in accordance with one embodiment of the present invention. As depicted in FIG. 10, system 1000 embodies a programmable SOC integrated circuit device 1010 which includes a two power domains 1021 and 1022. The power domain 1021 includes an "always on" power island 1031. The power domain 1022 is referred to as the core of the SOC and includes a CPU power island 1032, a GPU power island 1033, a non-power gated functions island 1034, and an instance of the video processor. The FIG. 10 embodiment of the system architecture 1000 is targeted towards the particular intended device functions of a battery-powered handheld SOC integrated circuit device. The SOC 1010 is coupled to a power management unit 1050, which is in turn coupled to a power cell 1051 (e.g., one or more batteries). The power management unit 1050 is coupled to provide power to the power domain 1021 and 1022 via the dedicated power rail 1061 and 1062, respectively. The power management unit 1050 functions as a power supply for the SOC 1010. The power management unit 1050 incorporates power conditioning circuits, voltage pumping circuits, current source circuits, and the like to transfer energy from the power cell 1051 into the required voltages for the rails 1061-1062.

In the FIG. 10 embodiment, the video processor is within the domain 1022. The video processor provides specialized video processing hardware for the encoding of images and video. As described above, the hardware components of the video processor are specifically optimized for performing real-time video encoding. The always on power island 1031 of the domain 1021 includes functionality for waking up the SOC 1010 from a sleep mode. The components of the always on domain 1021 will remain active, waiting for a wake-up signal. The CPU power island 1032 is within the domain 1022. The CPU power island 1032 provides the computational hardware resources to execute the more complex software-based functionality for the SOC 1010. The GPU power island 1033 is also within the domain 1022. The GPU power island 1033 provides the graphics processor hardware functionality for executing 3-D rendering functions.

Figure 11:
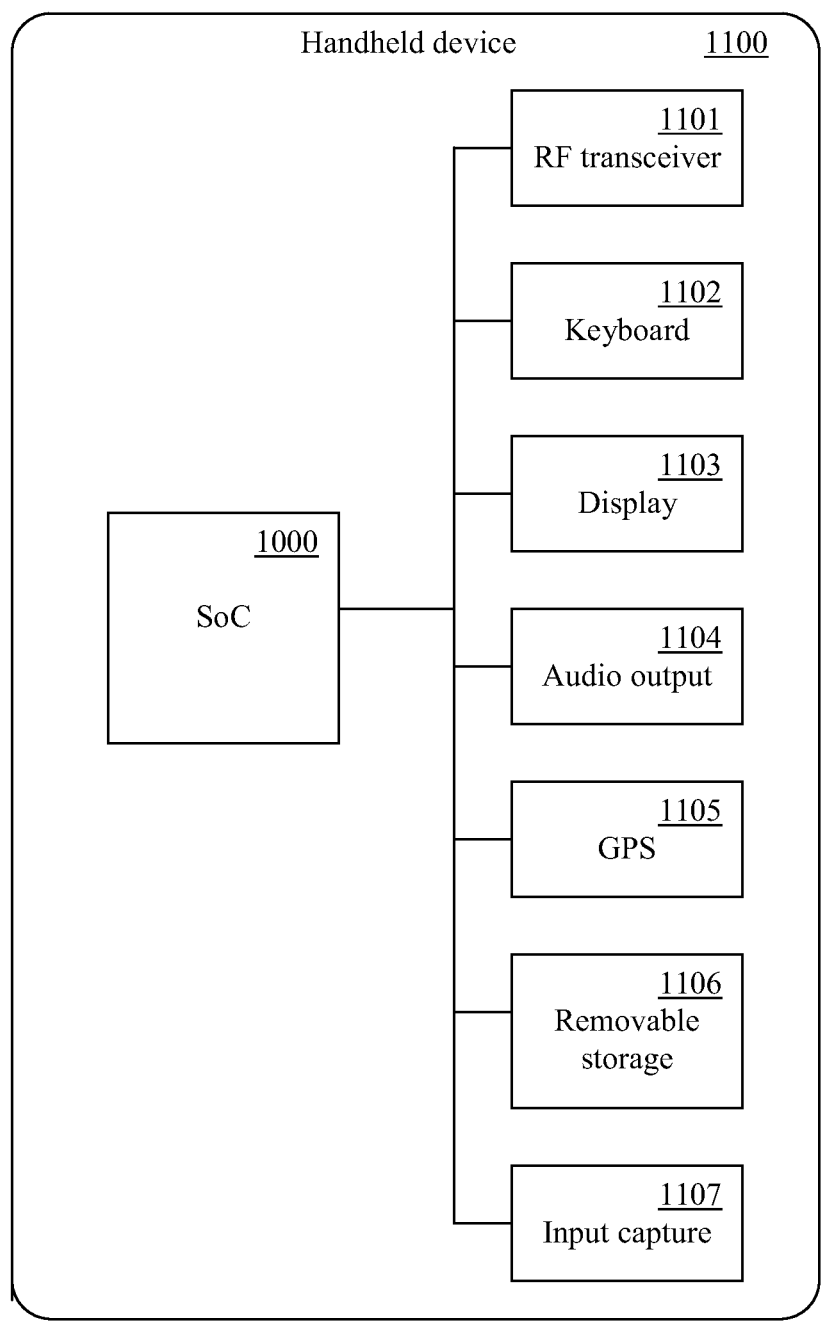
FIG. 11 shows a diagram showing the components of a handheld device in accordance with one embodiment of the present invention.

FIG. 11 shows a diagram showing the components of a handheld device 1100 in accordance with one embodiment of the present invention. As depicted in FIG. 11, a handheld device 1100 includes the system architecture 1000 described above in the discussion FIG. 10. The handheld device 1100 shows peripheral devices 1101-1107 that add capabilities and functionality to the device 1100. Although the device 1100 is shown with the peripheral devices 1101-1107, it should be noted that there may be implementations of the device 1100 that do not require all the peripheral devices 1101-1107. For example, in an embodiment where the display(s) 1103 are touch screen displays, the keyboard 1102 can be omitted. Similarly, for example, the RF transceiver can be omitted for those embodiments that do not require cell phone or WiFi capability. Furthermore, additional peripheral devices can be added to device 1100 beyond the peripheral devices 1101-1107 shown to incorporate additional functions. For example, a hard drive or solid state mass storage device can be added for data storage, or the like.

The RF transceiver 1101 enables two-way cell phone communication and RF wireless modem communication functions. The keyboard 1102 is for accepting user input via button pushes, pointer manipulations, scroll wheels, jog dials, touch pads, and the like. The one or more displays 1103 are for providing visual output to the user via images, graphical user interfaces, full-motion video, text, or the like. The audio output component 904 is for providing audio output to the user (e.g., audible instructions, cell phone conversation, MP3 song playback, etc.). The GPS component 1105 provides GPS positioning services via received GPS signals. The GPS positioning services enable the operation of navigation applications and location applications, for example. The removable storage peripheral component 1106 enables the attachment and detachment of removable storage devices such as flash memory, SD cards, smart cards, and the like. The image capture component 1107 enables the capture of still images or full motion video. The handheld device 1100 can be used to implement a smart phone having cellular communications technology, a personal digital assistant, a mobile video playback device, a mobile audio playback device, a navigation device, or a combined functionality device including characteristics and functionality of all of the above.

Thus, the novel systems and methods facilitate efficient utilization of unified virtual addresses across various components of a system on a chip (e.g., multiple processing components, processing engines, etc.). The novel approaches or solutions can use a combination of OS allocation on the CPU and GPU driver mappings to provide a unified VA across both GPU and CPU. The memory allocation scheme helps ensure that a GPU VA pointer does not collide with a CPU pointer provided by OS CPU allocation (e.g., like one returned by "malloc" C runtime API, etc.).

It is also appreciated the coordinated allocation of virtual addresses can facilitate a variety of beneficial advantages. The coordinated allocation can facilitate enablement of unified virtual addressing between or across various components (e.g., CPU, GPU, etc.). The coordinated allocation can be advantageous to a programmer because the programmer does not have to deal with two distinct address spaces. Thus, there is not a requirement for the programmer to keep track of the VA space a given pointer belongs to. A large chunk of CPU VA does not have to be pre-reserved upon initialization or before hand, since the CPU VA is essentially reserved on demand. This can be in particularly helpful in situations or scenarios with relatively small virtual address spaces (e.g., in a 32 bit CPU, 4 or less Megabyte virtual address capacity, etc. Unified VA can also be very important in the implementation of various CUDA features, like UVM (Unified Virtual Memory), where a single allocation can be used by both GPU and CPU. The coordinated allocation of virtual addresses can make programming and utilization of various components easier (e.g., CUDA programming of GPUs, etc.).

In one embodiment with a unified virtual memory space, the actual information is implemented on two different physical address spaces (e.g., a CPU PA, a GPU PA, etc.). It is possible that issues or bugs may arise that a user may desire to debug. It is important for a debugger to access the correct information (e.g., from the current or correct physical address space). If an invalid or inconsistent memory location is accessed the information may give rise to logic inconsistencies or bugs. In one exemplary implementation, a debugger is configured to facilitate access to the correct information. For example, access to unified memory is achieved via host and device interfaces in a debugger.

In some conventional information storage schemes or approaches in which information is stored or tracked on multiple components each with separate address spaces, users had to manually initiate or perform explicit copy operations to ensure current or accurate information is stored on the current or desired component or address space. In one embodiment, unified memory is an approach in which the separate memory components or address spaces appear as a single unified address space. Managing unified memory can be complicated and complex. Sometimes, unified memory architectures or schemes (e.g., compatible with CUDA 6.0, etc.) can result in cases where the same memory can be accessed on a host (e.g., CPU etc.) and on a device (e.g., GPU, etc.). Some approaches attempt to use two copies, one resident on the GPU and the other on the CPU. The CPU copy is invalidated at launch time and can only be fetched after the device is synchronized. The ability to access the latest or most up to date copy of the memory can be very important. For example, for users of a debugger, it is often very important to be able to see or access the latest copy of information, regardless of its current location (e.g., whether the latest copy is on a CPU, GPU, etc.).

Figure 12:
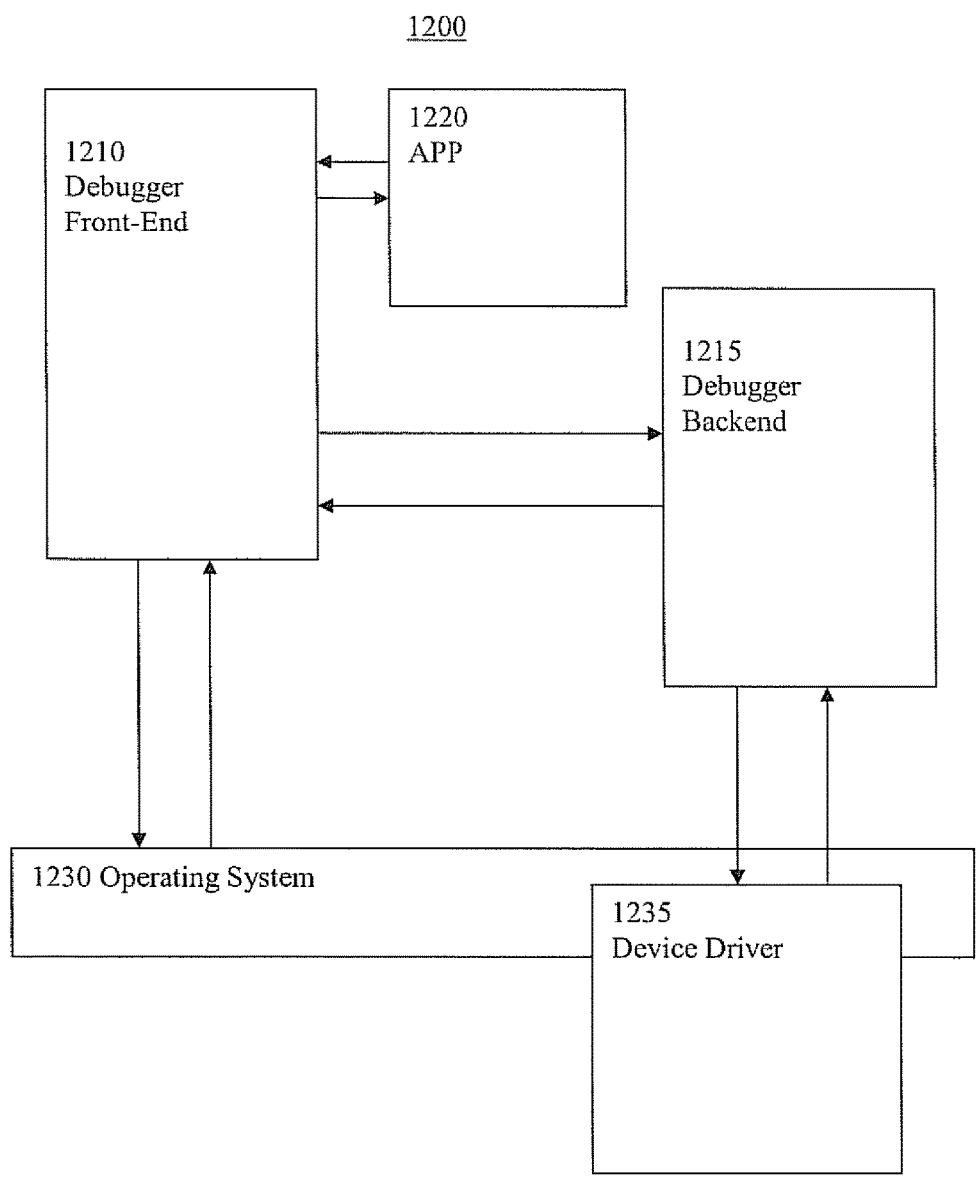
FIG. 12 is a block diagram of an exemplary debugging system in accordance with one embodiment of the present invention.

FIG. 12 is a block diagram of exemplary system 1200, one embodiment in accordance with the described approach. System 1200 includes application 1220, debugger frontend 1210, debugger back end 1215, operating system (OS) 1230 and device driver 1235. The debugger frontend 1210 communicates with application 1220, debugger back end 1215, and operating system (OS) 1230. The debugger back end 1215 communicates with device driver 1235. Application 1220 is that application that is running and the debugger is debugging. The debugger frontend 1210 can be an extension of GDB (e.g., CUDA gdb, etc).

In one embodiment, when a user tries to access a unified memory region a debugger (e.g., frontend, etc.) makes a call to an API (e.g., ptrace on Linux/Mac, etc.). An operating system can have some hooks in it and it goes and fetches the information. In one embodiment, a debugger frontend first attempts to directly access the memory or information from a component (e.g., a host, a CPU, etc.) using an API and the API fetches the memory if it can. Sometimes the API (e.g., ptrace, etc.) has limited access to memory or information (e.g., ptrace may be limited to accessing information on a host, a CPU, etc.). The attempted access by the debugger frontend can fail (e.g., if an address is not valid, if the information is not on the CPU, etc,). If the API call (e.g., ptrace, etc.) fails, the debugger can attempt another approach. The debugger frontend can make a call to the debugger backend. A driver (e.g., a CUDA driver etc.) notifies a debugger (e.g., a CUDA debugger, etc.) about allocations/deallocations as they happen. The debugger backend verifies if the memory is valid and then accesses this memory via a variety of approaches. The debugger backend can verify and access the memory via a mapping or function (e.g., a BAR1 mapping, an IFB mapping, an. ( ), etc.). In the case of reads, the backend usually returns a buffer with memory filled in. In the case of writes, the user provided buffer is written into the provided address.

Thus, unified memory is can be a very important addition to various programming models (e.g., CUDA, etc.). The described feature allows users to view/modify the contents of unified memory, which is a requirement for the debugger to function.

FIG. 13 is a flow chart of an exemplary method 1300, one embodiment in accordance with the described approach.

In block 1310, a memory allocation process is performed. In one embodiment, a memory allocation process similar to an address allocation process in block 120 is performed. In one exemplary implementation, a CudaMalloc call is made, memory is allocated on a GPU and a CPU, and a CPU PA space is mapped to a GPU VA space.

In block 1320, a temporary isolation process is performed. In one embodiment, the temporary isolation process includes temporarily breaking a link or map between the CPU PA space and the GPU VA space. The temporary isolation process can be utilized to prevent a user from reading information associated with the corresponding CPU PA space and the GPU VA space (e.g., information that is inconsistent, incoherent, inappropriate, etc.).

In block 1330, an update process is performed. In one embodiment, data is copied from a CPU PA to a GPU PA. The copying provides current/coherent content or information to the GPU.

In one embodiment, there are addresses or pointers in the virtual unified memory that user puts data in but that content is in the GPU PA or CPU PA at any given point depending on programming model. It is implemented in two different physical spaces and when debugging the user wants to access a valid or correct address space (e.g., with current information, correct version of information, etc.). There can be bugs that arise because a user may be confused (e.g., a user may have thought the information is on the CPU when in reality it is on the GPU, etc.). In one exemplary implementation, one copy is valid at a given time and if the user or debugger accesses a stale copy it can cause problems (e.g., there can be logic bugs in it, etc.).

In past there were two copies of information but in one example of the novel approach explained herein there is one copy in unified memory. In one embodiment the methodology is about accessing a unified memory from the debugger. The debugger wants to know if memory at a pointer or location is valid, 3 valid. Goes to front end and tries CPU first, and if it comes back invalid it makes a call to the backend of the debugger.

In one embodiment, a debugger uses and an API (e.g., ptrace, etc.) call and it will go and fetch memory as long as that memory is on the CPU. The OS can have some hooks in it and it goes fetches the information from CPU if it is valid on the CPU. The ptrace either returns the data or fails. If the memory is not on the CPU the ptrace fails. There can be various reasons for a ptrace fail. For example, an address or pointer is not valid at all (e.g., junk address), or the information is on a GPU but ptrace can not access GPU. When ptrace fails the debugger makes an API call to the backend process (e.g., which is the debugger backend, etc.). The backend process can tie closely to driver which makes low level hardware access—The backend debugger process verifies if the address or pointer is valid on the GPU and can use a variety of ways to fulfill the request.

In one embodiment, the front end can be a CUDA front end which is extension of GBD. There is an application running which GDB is debugging. In one embodiment, the approach includes figuring out if an address is valid, reading and writing data to that address. It figures out if is valid by checking front end by doing ptrace directly to OS. If that fails it asks the debugger backend and the debugger backend can do a lot of complicated things. It may fails because the address is not valid of junk of the data trying to access is currently resident on the GP. The device driver sitting there running inside the OS and can ask the device driver to read and write the address In one embodiment, a host is a CPU and a device is a GPU. The GPU can be an external component (e.g., plugged into motherboard, etc.).

It is appreciated, a debugger backend can do a lot of things. It can closely look at the state of the device (e.g., the GPU, etc.). There can be some parts of the GPU that are managed by the device driver (e.g., setting up page tables, etc.). An interrupt handler can runs on the GPU and the debugger backend can also talks to the interrupt handler. It is notified when the GPU hits a break point or hits fatal fault (e.g., invalid address, etc.). In one exemplary implementation, the debugger backend is almost an operating system for the GPU (e.g., the CUDA driver is sort of the operating system for the GPU when it is running CUDA programs, etc.).

In the ptrace access fails, then the debugger backend attempts to retrieve the information via an API call to read the memory. If the memory access fails, the backend process can get the memory back in a few ways. It can ask the device driver to create a mapping. In one exemplary implementation, PCI devices expose memory spaces expose small chunks of memory inside the driver that are then printed inside the CPU physical address space. There can be multiple chunks of physical memory that are exposed (e.g., called bar0, bar1, bar 2, etc.). These are essentially windows or ranges into the GPU memory. The address driver can create a virtual address space mapping into a portion of the bar. In one embodiment a program running on the CPU can access the virtual addresses and the operating system is responsible for mapping pieces of the virtual address space to the corresponding chunks of the CPUs physical address space. The device driver can modify the page tables on the GPU so that this bar window is essentially a sliding window into the GPU memory. The window can shift around and sort of peer into parts of the GPU memory. If a user asks the debugger to read hex 53 the device driver will figure out where that Hex 53 is actually located an it will change page tables on the GPU so that a bar (e.g., bar1, etc.) points to the window or range. It can use the OS's API to create virtual address mapping to the bar1. Something running on the CPU can read this and the driver can now access it and send it back as the response to the IO and the program can directly read this virtual address. In another exemplary approach, the mapping is created and the device driver reads the memory itself and sends back the content.

In one embodiment, the ways in which the content is sent back are different in which component reads the virtual address. The device driver can create the mapping by using a window or range and shifting and creating a CPU to VA mapping, then the device driver can read and write the memory itself and then send the content back to the user debugger. In one embodiment, the device driver can create the mapping and the debugger backend can go and read the VA space. The device driver creates the mapping to allow the window or range to shift and then either the device driver or backend can go read it directly.

In one embodiment the ifb is also a small window or range that is exposed in the physical address space that is mapped into the VA space. The ifb window can also move around and look at small portion of physical space. The ioctl is an interface that allows a user programmer to talk to a device driver.

In one exemplary implementation, a user accesses from a CUDA program. The user makes a CUDA call (e.g., CUDA-MALLOC, etc.) and request 1 megabyte of managed memory. When a user passes in a special flag called managed memory it indicates it is one unified memory. Behind the scenes the CUDA driver allocates memory on the GPU. The CUDA driver allocates memory on the GPU and also allocates memory on the CPU (e.g., allocates physical pages, etc.). The driver then maps the pages into the CPUs physical address space. This results in a piece of memory on the CPU and a piece of memory on the GPU and there is this link from the CPU VA back to the GPU. In one embodiment, the link is created at the beginning of time there and there is a copy of the data. When the user tries to access this memory they can access it directly because there is a mapping from the CPU VA to the CPU PA. In one embodiment, the link or mapping is broken or suspended. The link can be temporarily suspended or broken. Breaking or interrupting the link or mapping read memory prevents the user from accessing the memory. To keep the GPU contents current the contents are copied back into the GPU (e.g., giving the GPU has a current copy, etc.).

When the link is suspended and information is copied back a debugger can be utilized. In one embodiment, the users asks the GBD to read copies of memory and CUDA gdb tries ptrace, which fails because the CPU VA to CPU PA link is broken or suspended. The debugger makes an API call and asks the debugger backend to go read a pointer or address and validate the address. When the debugger backend validates it can ask the device driver to read the address directly from the GPU. The NVIDIA device driver can do this by either bar1 mapping or ifb. In one embodiment, the debugger resides on CPU.

In one embodiment, mechanism for managed unified memory is provided. Some programs (e.g., CUDA program, etc.) often need to maintain two copies of data when it needs fast access from both, the CPU and the GPU. This puts a burden on the developer or user to maintain and keep two pointers and both copies consistent which in turn can increases the barrier to entry for novice users of the programs, and also makes widespread adoption of associated components (e.g., GPUs etc.) harder, because it's more difficult to port existing code written for the CPU over to a heterogeneous system that has both, a CPU and a GPU.

With unified memory, the GPU driver allows the application to use a single pointer to data from both, the CPU and the GPU. Unified memory also enables "local" access to memory. In one exemplary implementation, it moves data between CPU memory and GPU memory when the CPU or GPU accesses that data. Having data be present locally typically increases the performance of those accesses.

The GPU driver reserves one or more regions from the CPU's virtual address space. The same or similar set of regions are also reserved in the GPUs virtual address space. The driver provides an opt-in allocator to the application to allocate out of these regions. The physical pages backing these allocations are created in GPU memory. A page fault handler manages migration of pages belonging to these allocations, migrating them back and forth between CPU memory and GPU memory as needed.

Normally, the address range representing an allocation is not mapped in the CPU's virtual address space. Upon CPU access of any unified memory data, the page fault handler copies the appropriate page from GPU memory to CPU memory, and maps it into the CPU's virtual address space. This allows the CPU to access that data.

When work is launched on the GPU, any pages that were migrated to CPU memory, are flushed back to GPU memory by the page fault handler, and the CPU's virtual address mappings *may* be unmapped. After this point, the CPU needs to synchronize on all the pending GPU work before it can access the same data from the CPU again. Otherwise the application could be accessing the same data from both, the CPU and the GPU, violating the programming model and seeing data corruption as a result.

One way the page fault handler can prevent such coherency violations is by throwing a segmentation fault on CPU access to data that is potentially being used by the GPU. However, the programming model doesn't require this, and this is only meant as a convenience to the developer to know when a concurrency violation occurred. There are other ways in which coherency violations can be prevented that may be part of the driver implementation.

The presented approach can enable CPU access to GPU data. In one embodiment there is an API call (e.g., CudaMalloManaged, etc.) and a driver (e.g., GPU driver, etc.) manages the memory. In one exemplary implementation, a decision is made where to place the memory associated with the single or unified pointer and accesses to that pointer are automatically managed. The "managed" pointer can be used across multiple different processors (e.g., CPUs, GPUs, etc.). For example, if the GPU tries to access the pointer or memory the data is put on or moved to the GPU and if the CPU tries to access the pointer or memory the data is put on or moved to the CPU. The movement or copying of information between the processor can be automated and transparent to the user utilizing a single "managed" pointer without having to be concerned about the concurrency or coherency of data between the different processors or memories (e.g., CPU, GPU, etc.). This management can be done transparently to the user or developer. The managed pointer can be accessed from multiple locations (e.g., multiple kernels, multiple processors, GPU, CPU, etc.).

There are a variety or ways to create managed memory (e.g., the managed memory can be created using an API call, managed keyword that can be applied to device variables, etc.). CPU page faults to the same location or pointer can be handled.

FIG. 14 is a flow chart of an exemplary method.

The following is one exemplary implementation utilizing two pointers and an explicit copy instruction:

```
_global k(int *ptr){
//use prt
}
void ( ){
int *d_ptr, *h_ptr;
size_t size=100;
CudaMalloc (& d_ptr, size);
k<<<1,1>>>(d_ptr);
h_ptr=Malloc(size);
CudaMemory (h_ptr, d_ptr, size); COPY
```

-continued

```
//verify h_ptr on CPU
printf("%d\n", h_ptr[0]);
}
```

The following is one exemplary implementation utilizing a single unified pointer:

```
_global_k (int*prt)
//use ptr
void main( ) {
int *ptr;
size_t size =100;
CudaMallocManaged (&ptr, size);
k<<<1,1>>>(ptr);
CudaDeviceSynchronize ( );
printf ("%d\n", ptr[0]);
}
```

The above code can begin with a keyword declaration (e.g., _managed_ _device_ int foo; etc.) and the last line can be an instruction to a device variable (e.g., printf ("% d/n foo"); etc.)

The described approach significantly reduces the barrier to entry for novice users. It also makes porting of code and the use of GPUs easier.

Figure 15:
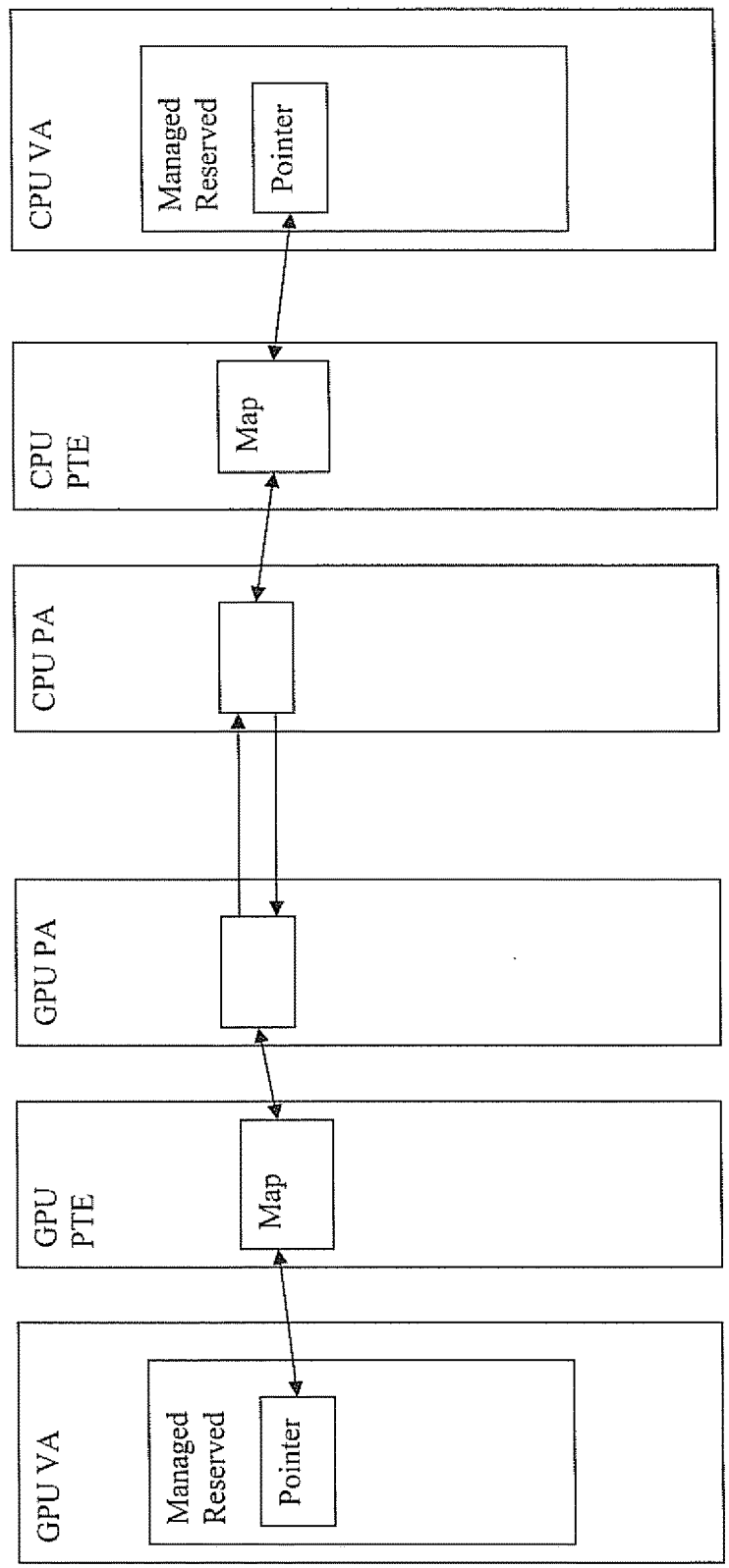
FIG. 15 is a block diagram of exemplary flow.

FIG. 15 is a block diagram of exemplary flow. Regions are reserved in the GPU VA space and the CPU VA space for managed. A portion of the reserved area in the GPU is assigned to the pointer which is then mapped in the GPU page tables (e.g., GPU PTE) to a portion of the GPU physical memory address (e.g., GPU PA). Access from the GPU to the pointer are handled based upon this mapping. When the CPU attempt to access the pointer, physical space in the CPU PA is allocated and the portion of the GPU PA is automatically copied to the CPU PA and a portion of the reserved space in the CPU VA is assigned to the pointer and a mapping between the CPU PA and CPU VA in the CPU PTE is also automatically performed.

In one embodiment, a new API call Cuda mallocmanaged is utilized. In one exemplary implementation, managed refers to the memory space that is managed by a driver (e.g., graphics device driver, etc.). A decision is made where to place the memory associated with a pointer and accesses to that memory are managed. The managing can include: when the GPU is accessing it make sure it is moved to the GPU and when the CPU is accessing make sure it is moved to the CPU. In one exemplary implementation, once a managed pointer is created the pointer is accessible from any location (e.g., a kernel, a processor, CPU, GPU, etc,).

In one embodiment, the need for h_pointer is eliminated and uses half as much memory as when the h-pointer is included. The cudamemcopy call can also be eliminated saving processing resources and time. The need for actually copying data from host to device or device to host is eliminated here. The system takes care of actually copying the data. In addition there are more subtle benefits. In past, even if only part of range (e.g., page, etc.) need to be copied, the conventional approaches copied the whole range (e.g., did a cudamemcopy of entire size, etc. In contrast, in one embodiment the copy is done based on access. When the CPU accesses a pointer there is actually a page fault handler (e.g., a kernel mode driver, etc.) and the ranges have already been resolved (e.g., with the kernel mode driver, etc.) and it sees that the access is directed to a particular pointer and copies that amount of data without excess data. In one embodiment, it know exactly what to copy. It can copy at smaller granularity based on access (e.g., copies limited amount of data as opposed conventional approach that copies a larger amount or whole range).

In is appreciated that there are multiple ways to create or allocate managed memory. One way is through an API. Another way is added keyword managed that can be applied to device variables. It can be part of the language itself. Prior to the novel managed API could only declare device variables here, but now the device (e.g., foo, etc.) has the same restrictions as CUDAmalloc. So the device foo can not be accessed from the CPU. If a user wants to access the data have to use a special API CUDAMEMCOPY symbol (e.g., a special API to copy to that location, etc.). The managed memory space allows use of keyword managed that can be applied to device variables. For example, can directly reference foo in the function (e.g., can just do a print of foo, etc.) without having to worry about copy instructions, it is now done automatically for the user. Using managed memory a user does not have to track or worry as much about coherence and copies between the two different pointers.

In one embodiment, there is support for CPU page faults to the same location or pointer. First thing it does when initializing CUDAmallocmanaged is see how much memory is in the system (e.g., see the GPUs in the system and how much each one has and the total memory in the system, etc.). The CPU has its own VA space and the GPU has its own VA space. A chunk of VA space is reserved on both the CPU and GPU. In one exemplary implementation some chunk of GPU VA space is prereserved (e.g., the space is not necessarily being used at this time).

In one embodiment, a CUDA malloc managed is done within the prereserved region and then it is used. Because the region is prereserved if the application calls malloc or some other CPU side allocator it will not call an address in this range because it is reserved. If the CPU calls malloc it will use some other space that is not been reserved. Reserving gives control over the pointers and the same pointers can be used in the CPU and GPU. If CUDAmalloc managed is used a chunk of CPU VA or reserved region is picked and the physical pages or actual physical memory on the GPU is allocated and then in the GPU VA space set up mapping from GPU page table (e.g., from that region set up mapping to that physical memory, etc). Now the GPU side is set up and if a kernel is launched the kernel accesses the pointer. Already have set up a mapping on the GPU from virtual to physical so it access that memory. When there is access to that same pointer from the CPU there is a page fault handler that is a kernel mode driver running and already notified when we the region is taken. The kernel mode driver is notified the region corresponds to that region of the GP so whenever there a CPU side access it allocates the GPU VA space region that is assigned. The CPU VA space is allocated through the mapping to the physical space in the GPU PA via the pointer. It is done in both the GPU VA and GPU VA. In one embodiment, when there is a cudamallocmanaged memory call and have to actually allocate memory then that is when it actually sets up the mapping. Prior to that just a reservation just providing notice not to use this range because going to be used for something later on.

In one embodiment, as soon as memory is allocated page tables are set up on the GPU. This can be done through various kernel mode calls which map that pointer range to that allocation (e.g., that is done on GPU). There is no change in CPU page tables. Have not indicated map these CPU pages to anything just yet. When there is an access to those pages from the CPU there is a page fault handler running on the CPU and that page fault handler is aware allocation on the GPU. So when it sees the page fault coming it gets the value of this pointer, given to it automatically by the operating system, and it allocates a physical page on the CPU. For example, it takes a page from GPU and copies to over to the CPU and then in the CPU page table sets up mapping to point to that. Then it returns back to the user and when it returns back to the user the pointer is now a valid virtual address that points to physical memory in CPU and the user can use the pointer to read and write.

What the page fault handler did at this stage on the CPU access was it allocated a physical page on the CPU, copied that same or corresponding location from the GPU memory, set up the CPU page table mappings and then allow the application to start using the memory from the CPU. If the next time say it accesses the pointer plus one and it happens in the pointer plus one is in the same page, then the kernel mode driver does not receive a fault because the page has already been paged in and it will be a relatively fast access. But if the attempted access crosses the page boundary, then it maps data in again. If the user tries to read a pointer value that is not valid (e.g., accesses some pointer that was never actually allocated, etc,) then the page fault handler know it is not valid.

In one embodiment, on a CPU access the CPU access actually copies data over from the GPU. When doing a kernel launch, the page fault handler is notified that a kernel launch is being performed and if there has been any data accesses then it is migrated back to GPU. The page fault handler goes and looks at relevant information resident on the CPU and copies it back to GPU and then GPU can use it. Then the kernel is launched and the kernel can use the data because it is up to date. In one exemplary implementation, during the kernel launch is when there is a copy back to the GPU and the GPU can use it.

In one embodiment, a CUDA device synchronize call is performed. The CUDA device synchronize can be called before accessing data from CPU again (e.g, call cuda device to synchronize, etc.). If a synchronize call is not made the data may not be coherent and can cause data corruption. In one exemplary implementation, the data programming model does not allow concurrent access to the data by both the GPU and CPU at the same time and that is why a CUDAmallosyncrhonize is included. Can help make sure the kernel is actually completed. In one exemplary implementation, kernel launches are asynchronous and the only way to know a kernel has completed is by making a synchronize call. There are various ways to synchronize. A device synchronize can be performed which means synchronize the work launched on the device or GPU. Also can do a cuda stream approach. The synchronize is before it can access from the CPU again. If the synchronize is not performed and try to access if from the CPU the page fault handler actually has the information and knows the allocation is potentially being used on the GPU and it throws a segmentation fault here and without this CUDA call results in a segmentation fault because the page fault handler is indicating there is an attempt to do an incorrect access to data because the GPU is still is using it. It is appreciated that the segmentation fault is not necessarily the only approach, other approaches can be used to ensure synchronization.

Another way to synchronize is utilizing page merging. In one embodiment, a kernel is running and using the data actively when there is a call for a device synchronize data on the CPU. It will make another backup copy of it so there are two copies of the page and it will set up the page tables to map to this page, so the page table is actually pointing to locations where the user can use the data meanwhile there is another backup page that contains the original copies. A three-way merge of the three copies is performed and a new page that contains the updated information from the three pages is created. In one exemplary implementation, segmentation fault is no longer thrown, instead it does page merging behind-the-scenes.

In one embodiment unified memory allows the same address space to be used in unified memory and at times it can be local. For example it can be in a host (e.g., CPU) or a device (e.g., GPU). Consistency is automatically maintained (e.g., latest concurrence, etc.). In addition, CPU faults to the same location in the unified memory are handled even with two distinct or discrete physical memories (e.g., the CPU and the GPU, etc.). In on exemplary implementation, it does not use a unified set of page tables and there can actually be two different sets of page tables. Then when the CPU access happens the page fault handler receives a fault and it allocates the physical page copies the data over and sets up the CPU side. There are two different memory spaces here and allow the user to treat them as if it is one single memory space. It is not a conventional unified memory but is allowing two different virtual address space is to be treated as one. In one embodiment, a user does not have to explicitly manage the two memories space. It allows the programmer to approach management of the single memory in reality for multiple memories and the automate management of the spaces enables the system to take care of putting the data where it is necessary based on accesses.

In one embodiment, unified memory support is provided across multiple heterogeneous processors. With unified memory support in a system, data can be accessed using the same pointer from the CPU and the GPU in that system. However, for systems that contain multiple GPUs, the same pointer has to be accessible across all GPUs that are capable of supporting unified memory. Given the wide variety of multi-GPU systems in use (containing GPUs of different architectures and capabilities), supporting unified memory seamlessly across all such systems is challenging.

Peer-to-peer (P2P) communication between GPUs allows two GPUs to access each other's memory (e.g., over a PCIE bus, etc.). P2P support can be limited to certain configurations. For example, P2P is may not be supported between GPUs of different architectures. So many systems that have multiple GPUs may or may not have P2P support between those GPUs.

Multi-GPU systems can contain a combination of GPUs that may or may not support unified memory. In one embodiment, for GPUs that don't support unified memory, any unified memory allocation is never mapped into that GPU's virtual address space. This traditionally prevents those GPUs from ever accessing unified memory.

Among the GPUs that do support unified memory, if there's peer-to-peer support between all of them, then unified memory allocations are created in GPU memory. The GPU chosen to create the allocation depends on which GPU the application was referring to when it requested the allocation to be created (this behavior is exactly similar to cudaMalloc, which allocates memory on the GPU). Peer mappings are then set up in all the other GPUs virtual address space to point to the same allocation. This allows all GPUs to access the memory using the same pointer.

In systems that have multiple GPUs that support unified memory, but without peer-to-peer support between any two of those GPUs, the driver places the allocations in zero-copy memory (i.e. CPU memory that is pinned so that it can be accessed from both, CPUs and GPUs). All the GPUs supporting unified memory will have virtual address mappings to this zero copy memory. In this scheme, the page fault handler is not engaged to copy data back and forth between CPU and GPU memory. Instead, the data always resides in CPU memory. This doesn't change the programming model in any way. It only imposes a performance penalty when accessing data from the GPU.

Coherency violations when zero-copy memory is used *may* be prevented by using OS provided mechanisms like mprotect to prevent CPU accesses to such memory while the GPU is accessing it. Note that this is only done as a convenience to the developer to be notified of coherency violations and is not required by the programming model. There may be other ways in which the driver may prevent concurrency violations.

Using the above scheme, all the GPUs in the system that support unified memory can access the same data using the same pointer.

This simplifies the usage of unified memory, and reduces burden on developers to adapt their applications based on what GPUs are present in the system.

In a method according to one embodiment of the present invention, a method for attaching data from an allocated memory space to a particular stream is disclosed. In one exemplary embodiment, after a portion of memory is allocated that is accessible by any stream, the allocated memory or a portion of it may be attached to one of a host and a particular stream. Therefore, a portion of data reached by de-referencing a pointer that points to the allocated memory may be attached to a particular stream or the host.

This present invention provides a solution to the increasing challenges in concurrency management between CPU memory and GPU memory in a unified memory arrangement. Various embodiments of the present disclosure provide for the attachment of portions of allocated memory to parallel processing streams such that a pointer pointing to data in an attached portion of allocated memory is independent of any other parallel processing stream or process.

It is desirable for an application to be able to assign ownership of data at a fine grained granularity so that the CPUs and GPUs can be kept as busy as possible without having to constantly synchronize to each other. This can increase performance by increasing concurrency in the application, and also providing hints to the GPU driver to manage unified memory in a more efficient manner.

In one exemplary embodiment, a parallel processing architecture provides the ability to assign ownership to unified memory data by allowing the application to attach data to parallel processing streams. When data is attached to a parallel processing stream, the application makes a guarantee that only work launched in that stream will access that data from the GPU. If the application needs to access that data from the CPU, it synchronizes the stream appropriately to ensure there is no work pending on the GPU from that stream (otherwise it may cause data corruption).

In one embodiment of the present invention, there are two type of streams that data can be attached to. A first type of stream is a "global" stream that represents all streams in the process that can access unified memory. When data is attached to the "global" stream, any work launched in any stream can access that data from the GPU. In order to access that data from the CPU, the application must ensure that there's no work from any stream pending on the GPU, by synchronizing those streams. A second type of stream is a "host" stream, that applications can attached data to if they intend to access that data from the CPU. No work in any stream launched on any GPU can access that data.

Attaching data to streams allows the GPU driver to manage migration of data between CPU and GPU memory efficiently. When work is launched in a stream, the driver checks if any pages were migrated to CPU memory that are accessible by that stream. It then flushes those pages back to GPU memory. In other words, it flushes data that is attached to either that stream or the "global" stream. Any data attached to any other stream or the "host" stream is left as is. Attaching data to streams also allows the application to increase concurrency in the application by reducing the need for synchronization.

Embodiments of the present invention provide for improved parallel processing performance of parallel processing-capable applications using unified memory because the total amount of page migration is reduced. It also helps multi-threaded applications, where each thread can be launching work on the GPU independently by creating its own stream and attaching data appropriately, and not having to synchronize with other threads.

In one embodiment of the present invention, an exemplary computer executed process for managing a CPU memory and a GPU memory when under a unified memory arrangement is illustrated. In one exemplary embodiment, the computer-executed process steps may be implemented in a C, C++ or other similar programming language.

Program 1:

```
__global__ void kfro(int *ptr)
{
    *ptr = 1
}
```

Program 2:

```
void main ( )
{
    int *h_ptr, *d_ptr;
    CudaMalloc(&d_ptr, sizeof(int));
    k<<<1,1>>>(d_ptr);
    h_ptr=malloc(sizeof(int));
    cudaMemcpy(h_ptr,d_ptr,sizeof(int));
    printf("%d\n", *h_ptr);
}
```

Program 3:

In one embodiment, an exemplary program utilizing unified memory may be drafted as:

```
void main( )
{
    int *ptr;
    CudaMallocManaged(&ptr, sizeof(int));
    k<<< 1, 1 >>> (ptr);
    cudaDeviceSynchronize( );
    Printf("%\n", *ptr);
}
```

The goal of unified memory is to make it easier for users to program GPUs. An object is to simplify parallel processing methods for users new to parallel processing in GPUs. There is also the desire to allow advanced users to be able to get the benefits of the parallel processing methods.

At the basic level, a parallel programming program is illustrated with the simple code example, labeled program 1 that is used to call a kernel. Program 2 is also a basic program. Program 2 begins by allocating memory on the GPU. The way this program does this is by making the call: "CudaMalloc(&d_ptr, sizeof(int))." This allows a portion of memory at pointer "d" to be allocated a desired number of bits (indicated by sizeof(int)). Next program 2 passes the pointer to the kernel. The syntax "k<<<1, 1>>>" may be used to launch a kernel that is launched in the GPU. Meanwhile, h_ptr=malloc(sizeof(int)) allocates an "int" sized allocation on the CPU side. Then cudaMemcpy(h_ptr, d_ptr, sizeof(int)) is used. Issuing a cudamemcopy( ) call is used to copy from the GPU allocated memory to the CPU allocated memory (from d_ptr to h_ptr). The "d" and "h" refer to device and host, respectively, which refers to the GPU and the CPU respectively. This call issues a copy from the d pointer to the h pointer, and then the following functional call "printf" should be able to print out a 1. The kernel sets the d pointer to 1 and this is passed to the h pointer, and the h pointer is used to point to the information that is printed out.

In this approach a programmer has to maintain two pointers. While there is only one piece of data, there are two pointers to it (as the data is found in both GPU and CPU allocated memory). The GPU cannot access the GPU allocated memory. In other words, if the d pointer was passed to the CPU, the CPU would not be able to access the allocated memory in the GPU. At the same time, the GPU is not able to access the CPU allocated memory. If the h pointer was passed to the GPU, the GPU would not be able to access the allocated memory in the CPU. Therefore, the memory must be allocated in both GPU memory space and CPU memory space. Both of these memory spaces have to be managed: two pointers have to be maintained and the data copied back and forth depending on where the data is needed, to make sure that the latest access of the data will receive a current copy of the data. In one embodiment, the data needs to be consistent between the two allocated memory spaces. This puts a burden on the developer to manage.

Novel approach exemplary embodiments described herein simplify this concurrency requirement. As illustrated herein, program 3 utilizes unified memory, such that only a single pointer is used. While the same kernel is used as in program 2, only a single pointer is used in program 3. The original call "cudamalloc" is replaced with the call "CudaMallocManaged," which refers to "managed memory." When using unified memory, the memory spaces are managed for the programmer. Therefore, the data is moved to either the GPU memory space or the CPU memory space based on where its being accessed.

CudaMallocManaged will still allocate memory on the GPU. The kernel will also launch in the same way and also access the pointer in the same way. After the kernel has been called, the function "cudaDeviceSynchronize" is called.

This can make sure that the kernel has completed. In one embodiment, after launching the kernel, the program returns immediately, the program does not wait for the kernel to complete before returning. So, once the kernel has returned, a synchronize call (e.g., cudaDeviceSynchronize) is used to determine whether or not kernel has completed the operations. In another embodiment, there may be other functions that may be called to verify that the kernel has completed. By calling the synchronize function, the program can continue (after verifying that the kernel has completed, or waiting for the kernel to complete before continuing). Therefore, since the kernel has completed, when the print function is called, the pointer is accessed from the CPU.

In one embodiment, the need for two pointers for the same data is eliminated and the program doesn't need to use as much memory. Previously, memory in both the GPU and the CPU is allocated (using twice as much memory). Here, the memory is allocated on the device, but the Malloc call isn't used (two pointers aren't used). This program also does not have to explicitly perform a memory copy. This functionality is being performed automatically by the unified memory functionality. Therefore, the code can be more easily written.

Figure 16:
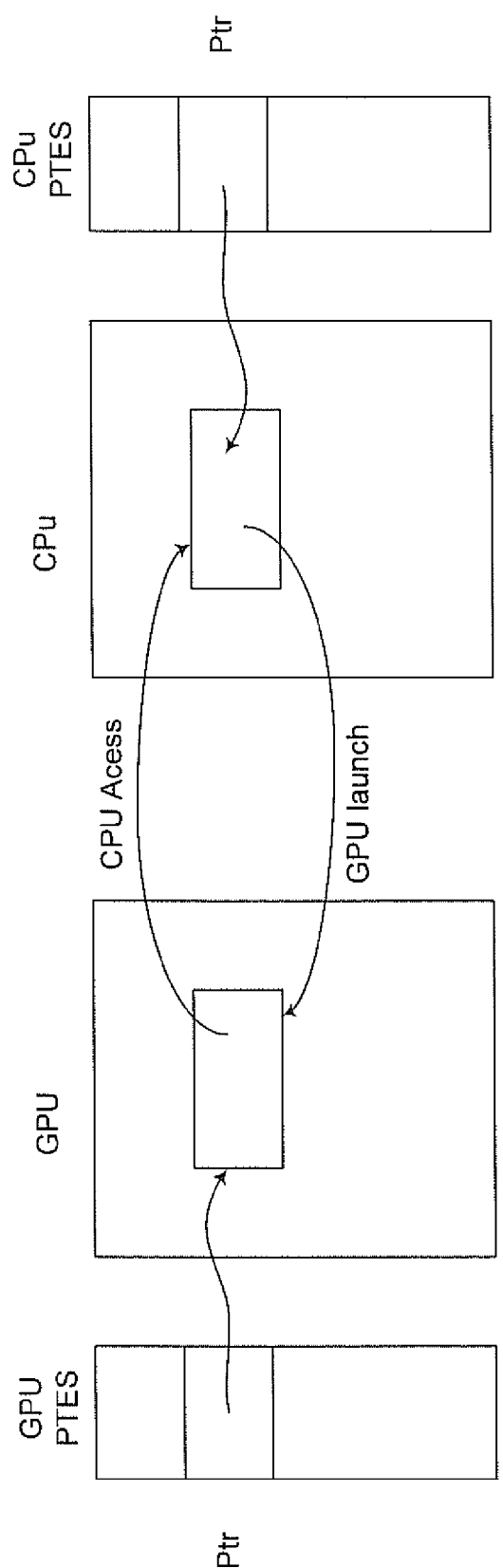
FIG. 16 is another exemplary system in accordance with one embodiment of the present invention.

In program 3, rather than using separate d pointers and h pointers, a single pointer that can be used on both sides (GPU and CPU) is used. This is illustrated in FIG. 16, where memory regions for both the GPU and the CPU are illustrated. When the function CudaMallocManaged is used, memory is allocated in the GPU, such that the page tables in the GPU have a pointer to the allocated memory in the GPU's memory space. So when something is running on the GPU, the pointer will point to a valid memory address and the data that it contains.

In one embodiment, however, when that same pointer is accessed on the CPU's page tables, the pointer does not point to anything valid (initially). In one exemplary implementation there is an exemplary page fault driver that catches this access, and so as soon as this pointer is de-referenced, this page fault handler catches that access and receives a fault. The page fault handler will see that the pointer is pointing to an allocated location in the GPU memory space. In response to seeing that the pointer is pointing to allocated memory in the GPU, the page fault handler allocates a portion of memory in the CPU memory space and copy the data over from the GPU to set up the mapping. After this point, the application can dereference this pointer on the CPU side and receive a valid response (the data).

This is the point where the data is allowed to be accessed from either side (CPU or GPU). The cudamallocmanaged allows a custom page fault handler to be set up for handling the CPU accesses the shared memory. When the parallel processing environment is established, a quantity of available memory is determined and a portion of it is reserved on the CPU, and is used to forward faults to the custom page fault handler.

In one embodiment, the page fault handler is able to see that a portion of memory in the GPU has been allocated and it is to this portion of memory that the faulting pointer is pointing. The custom page fault handler is operable to allocate a portion of memory in the CPU memory space and copy the data (e.g., that the pointer is pointing at, etc.) to the portion of allocated CPU memory.

Once the data has been copied to the CPU memory space, should a new kernel launch be initiated, the GPU will have accessed the data (and potentially changed/updated it). Therefore, when a kernel is seen launching, the custom page fault handler will need to copy the data back from the CPU memory space to the GPU memory space, so that the new kernel launched in the GPU will have the current version of the data. Therefore, the data in the GPU memory space will be copied to the CPU memory space (and allocated if necessary) when there is a CPU access, and the data in the CPU memory space will be copied to the GPU memory space when there is a kernel launch. In one exemplary embodiment, the copy will only be performed when the data has been modified. Such copying allows the data to be consistent regardless of whether the CPU or the GPU is trying to access the data.

Note that while the CPU has page faults, the GPU does not. Because of the page fault handler in the CPU, it is known what data on the GPU needs to be copied to the CPU for processing. However, because there is no page fault handler in the GPU, when the GPU is accessing the data, there is no way to know what portion of the data is being accessed, therefore, all data that has been modified is copied back to the GPU. In one embodiment, the data is transferred at the page granularity. Each page that has been accessed by the CPU is copied back to the GPU. In other words, any page that has been written by the CPU at the time that a GPU kernel launch is made will be written back to the GPU memory space, regardless of whether or not the GPU is going to access them or not. In one exemplary implementation, there is no way to know what the GPU is going to handle. Therefore any page that has been modified is copied back.

The way that the unified programming model is defined today is that the GPU and the CPU cannot access the data simultaneously. Therefore, if there was not a Cudadevicesynchronize function placed in the code before the pointer was de-referenced, then the page fault handler would throw a fault. The page fault handler would be aware that a previous kernel had been launched and is not able to know whether or not the kernel had completed. So the page fault handler will not allow the CPU to de-reference the data point because the data may be in use (by the kernel running in the GPU). The page fault handler has no way to know whether or not the kernel is complete and will therefore, conservatively not allow the pointer to be de-referenced. So the devicesynchronize function needs to be used after the kernel launch to make sure that the kernel has completed, so that the data in question is not currently being used by the GPU.

The idea is to make sure that any work that could be accessing the pointer has finished in the GPU before the CPU is allowed to access the data. This can be considered a very conservative approach because in this current parallel programming model the GPU and CPU are not allowed to simultaneously access the data, therefore, any potential conflict is avoided.

Besides the removal of the need for two memory spaces, consider that when a small portion of the allocated memory has been accessed, under the conventional process, the entire allocated memory would needs to be copied over, not just the portion that has been accessed. For example, conventionally, if two pages of a 100 megabyte memory space on the GPU side have been touched, because conventionally there is no way to know what pages are going to be accessed by the CPU, a full d pointer copy to h pointer copy must be executed before the h pointer can be passed to the library caller.

This allows the two pages that have been modified to be copied rather than the entire allocated memory. Using the unified memory under the exemplary processes described herein, the memory management can be handled automatically. When the single pointer is passed to the library the library dereferences it, and based upon what it actually tries to access, those pages are copied over to the CPU memory space by the page fault handler. So what is necessary is copied on demand. This optimizes what is being copied. In one embodiment, CPU access can be rapid, copying over only that updated data that it needs. But on the GPU side, all previously modified pages will have to be copied over, but only those pages that were modified, and not the whole allocation.

Automatic memory management may not be suitable when the user wants more control over when the memory management takes place. In one embodiment, every time that an allocation is created and a kernel is launched, the kernel can use a portion of the allocated memory. For that matter, because the kernel could be using any portion of the allocated memory, even though it is only going to use a small portion of the allocated memory, conventional unified memory methods do not allow a GPU and a CPU to access the data in the allocated memory at the same time (to prevent the one of the GPU or CPU from accessing the same data while the opposite CPU or GPU is accessing the same data). This can be an impediment to many applications that may be attempting to launch a large number of threads. In one exemplary implementation, to make sure that data ownership is maintained (that only a specified set of kernels will have access to the allocated memory space), the streams need to be synchronized.

For example, in the conventional program 2, that requires a pointer allocation to ensure that.

Figures 17, 18:
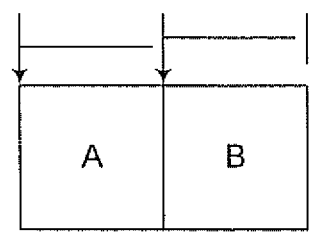
FIG. 17 is an illustration of flow in two different parallel streams in accordance with on embodiment of the present invention.
FIG. 18 is an illustration of half of the allocated memory attached to a first stream while the other half of the allocated memory is attached to second stream in accordance with one embodiment of the present invention.

For example, as in FIG. 17, if there are two cudaMallocManaged allocation calls (for two different streams (e.g., stream A and stream B), instead of the single cudaMallocManaged call from program 3, then on the kernel launch, both of them need to be copied because there is no way to know which one would be used. However, if there are two threads, and one is using cudaMallocManaged for a pointer A and the other is using cudaMallocManaged for a pointer B, and they are independent and there is a guarantee that pointer A is never going to access the memory space allocated for pointer B and pointer B is never going to access the memory space allocated for pointer A, the problem is that under kernel launch, both of them, either kernel will still have to copy both of the allocations across and that can cause problems.

A parallel processing stream, as illustrated in FIG. 7, is a way to submit a sequence of work to the GPU for launch. For example, in FIG. 17, for stream A, kernel K0 is to be launched, followed by K1, and lastly by K2. In other words, K1 won't start until after K0 finishes and K2 won't start until after K1 finishes. This is the basic idea of a stream, is that the work in the stream is serialized and for a given point in the stream, work won't begin until the work before that point in the stream has finished.

This is how concurrency had been accomplished in the GPU. For example, K0 and K3 can be launched concurrently on the GPU because they are in separate parallel processing streams and will have separate, independent memory allocations. This can be very important for multi-threaded programs. If each thread is performing a separate piece of work, the threads can be launched on separate, independent parallel processing streams. So each thread can perform its work independently.

The problem here is that when using the CudaMallocManaged call to manage the allocation of memory space for the GPU, when K0 is launched on stream A and K3 is launched on stream B, at some point there will be a CudaStreamSync( ) call to synchronize everything that has been performed on that particular stream, followed by a de-referencing of the associated pointer. A CudaStreamSync (A) call will synchronize stream A, while the cudaDeviceSynchronize( ) call will synchronize streams in the GPU. As noted above, when a cudaStreamSync(A) is called, followed by an attempt to de-reference the pointer (e.g., using *ptr=0), there can be issues because the system can require completion of threads that are running and that could potentially access this pointer. In other words, a fault will be set because there are other threads that are launching kernels that could potentially be using this pointer and so in order to de-reference this pointer on the CPU, the threads in the process are synchronized. This would be very undesirable because the whole point of running separate parallel processing streams is the intention of executing multi-threaded programs where multiple threads can be launching kernels in the GPU concurrently. In other words, it is desirable to not synchronize between threads when it isn't necessary. So, this is where a notion of attaching data to streams comes in.

For example, in one exemplary embodiment, a CudaMallocManaged call includes a third argument as illustrated herein:

CudaMallocManaged(&ptr, size, CudaStreamAttachGlobal), or in the alternative:

CudaMallocManaged(&ptr, size, CudaStreamAttachHost).

In one embodiment, the argument "CudaStreamAttachGlobal" is a default argument and is expressly specified. This is an argument that can be specified as "global" or "host." In one exemplary implementation, when the function CudaStreamMallocManaged is called with the argument "CudaStreamAttachGlobal" it means that this particular memory allocation is visible to all streams and all threads in the process. However, it can be desirable to limit the visibility of a pointer to only a particular associated stream. Therefore, in one embodiment, an additional call may be issued to attached data to a particular stream, for example stream A: CudaStreamAttachmemASync(A, ptr, size, cudastreamattach(one of Global, Host, or Single is selected as an argument here). This means that a particular pointer is associated with a particular stream. Once this stream attachment has been accomplished, then the kernels in the stream can be launched (K0, K1, and K2), and a cudaStreamSync (A) can be called followed by a pointer de-reference, completed independent of what the other streams are doing. The stream attach call is a guarantee by the user that the pointer associated with a particular stream will not be used anywhere else on the GPU except on that stream. Therefore, a kernel being launched in another stream does not have to worry about copying the data the pointer points to in stream A. As far as the pointers are concerned, an assumption is made that the pointer associated with stream A is not being used in any other stream (e.g., stream B). There is no check to ensure that the pointer isn't being used in another stream, it is a guarantee by the user that the pointer will be exclusively for the specified stream. In other words, if a user used the pointer in another stream, this would be a violation of the programming model and result in errors and difficulties in execution of the parallel processing threads.

This allows threads to do independent work. In one embodiment, it can remove the necessity to synchronize all threads. Only those threads in the same stream need to be synchronized. It also helps in optimizing how much data is written back on each kernel launch. Now when a kernel is launched (e.g., K3 or K4), even though the pointer for stream A was copied over to the CPU, there is no need to write it back to the GPU before K3 or K4 is launched because this data was for stream A and K3, K4, and K5 are not going to touch it.

Data can be attached to a specific stream, or it can be attached to global (attached to all streams in the process).

As noted above, there is another option, the data can be attached to the host as illustrated herein:

CudaMallocManaged(&ptr, size, CudaStreamAttachHost).

This may be used in situations when the data needs to be de-referenced by the CPU right away. By default, this argument is set to "global," which means that any thread in the process could be using this data, so with the default cudamallocmanaged call with the default "global" argument, if the CPU attempts to de-reference the pointer, there is a potential for a fault because some other process may be using the data that the pointer points to. Therefore, this sort of behavior needs to be eliminated. Rather than requiring some synchronization of all threads, a "host" flag may be used instead for the argument which means that the data will only be touched from the CPU side, so anything the GPU may be doing to the data will not affect it. Therefore, the CPU could de-reference the pointer without causing a fault.

If it was desirable to then allow the data for this stream to be accessed from the GPU, the data would need to be attached to either a stream or globally. This also allows further optimization, because anything attached to the host doesn't need to be copied back to the GPU. When a kernel is launched on the GPU, this particular type of data will not have to be copied to the GPU. The idea of attachments is to enable further concurrency and to optimize when data needs to be copied back and forth.

While the call "CudaMallocManaged" will allocate on the GPU, the flag (global, host, etc.) indicates who will be accessing the data. A later attachment can be used to indicate that the data in the allocated memory is to be attached to a particular stream or to all streams ("global"), instead of the original "host" argument.

The advantage of using the argument "host" is that the data is already attached to the CPU and the CPU is able to immediately de-reference the data without any further synchronization steps.

The CPU still accesses the data in the allocated memory space on the GPU using the previously mentioned page handler that copies the data from the GPU to the CPU for access by the CPU. The difference here is that when using the "host" argument, once the data has been copied to the CPU, the data attached to the host will not be copied back if a later kernel is launched in the GPU.

In one embodiment, there are four arguments in a CudaStreamAttachmemAsync, a "size" argument can be added. This allows for the same of the portion of memory to be set for allocating. For example, as illustrated in FIG. 18, half of the allocated memory can be attached to stream A, while the other half of the allocated memory is attached to stream B.

This can be used in situations when a multi-threaded application is operating on a large buffer that could be sub-divided for efficiency. For example, as illustrated in FIG. 18, a portion of it could be set aside for stream A, while the remainder can be set aside for stream B. This would allow applications to attach portions of an allocation to a stream. this would allow a multi-threaded program to run more efficiency, by breaking out the various streams into their own separate, attached allocated memory space. Such applications wouldn't require as much rewriting before they could be run in the GPU rather than the CPU.

These embodiments could be implemented into any language or library model that could be implemented in a GPU. It could also be implemented in any system with a non-unified memory.

Some portions of the detailed descriptions are presented in terms of procedures, logic blocks, processing, and other symbolic representations of operations on data bits within a computer memory. These descriptions and representations are the means generally used by those skilled in data processing arts to effectively convey the substance of their work to others skilled in the art. A procedure, logic block, process, etc., is here, and generally, conceived to be a self-consistent sequence of steps or instructions leading to a desired result. The steps include physical manipulations of physical quantities. Usually, though not necessarily, these quantities take the form of electrical, magnetic, optical, or quantum signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are associated with the appropriate physical quantities and are merely convenient labels applied to these quantities. Unless specifically stated otherwise as apparent from the following discussions, it is appreciated that throughout the present application, discussions utilizing terms such as "processing", "computing", "calculating", "determining", "displaying" or the like, refer to the action and processes of a computer system, or similar processing device (e.g., an electrical, optical, or quantum, computing device), that manipulates and transforms data represented as physical (e.g., electronic) quantities. The terms refer to actions and processes of the processing devices that manipulate or transform physical quantities within a computer system's component (e.g., registers, memories, other such information storage, transmission or display devices, etc.) into other data similarly represented as physical quantities within other components.

It is appreciated that embodiments of the present invention can be compatible and implemented with a variety of different types of tangible memory or storage (e.g., RAM, DRAM, flash, hard drive, CD, DVD, etc.). The memory or storage, while able to be changed or rewritten, can be considered a non-transitory storage medium. By indicating a non-transitory storage medium it is not intend to limit characteristics of the medium, and can include a variety of storage mediums (e.g., programmable, erasable, nonprogrammable, read/write, read only, etc.) and "non-transitory" computer-readable media comprises all computer-readable media, with the sole exception being a transitory, propagating signal.

It is appreciated that the following is a listing of exemplary concepts or embodiments associated with the novel approach. It is also appreciated that the listing is not exhaustive and does not necessarily include all possible implementation. The following concepts and embodiments can be implemented in hardware. In one embodiment, the following methods or process describe operations performed by various processing components or units. In one exemplary implementation, instructions or directions associated with the methods, processes, operations etc. can be stored in a memory and cause a processor to implement the operations, functions, actions, etc.

1. An address allocation process comprising:
  allocating physical memory pages to a second component;
  allocating a virtual address associated with a first component; and
  mapping the allocated physical pages to the virtual address allocated in association with the first component, wherein the mapping of the virtual address allocated in association with the first component is performed by an element associated with the second component.

3. The address allocation process of Concept 1 wherein an operating system (OS) function is used to allocate the physical memory pages.

4. The address allocation process of Concept 1 wherein actual physical pages associated with the first component are not allocated.

5. The address allocation process of Concept 1 wherein the second component is a GPU and the mapping is done via the GPU driver 6. The address allocation process of Concept 1 wherein the GPU diver maps a virtual address allocated to a CPU.

7. The address allocation process of Concept 1 wherein the virtual address VA obtained allocated to the first component is returned to the user.

8. A system comprising:
   a central process unit (CPU);
   a graphics processing unit (GPU) coupled to the central processing unit; and
   a memory for storing information utilized by the GPU and CPU, wherein address spaces associated with the memory are allocated in accordance with an address allocation process including:
   allocating physical memory pages;
   allocating a virtual address (VA) associated with the CPU; and
   mapping the virtual address allocated in association with the CPU to the physical memory pages, wherein the mapping of the virtual address allocated in association with the CPU is performed by a driver associated with the GPU.

9. The address allocation process of Concept 8 wherein possibility of a GPU virtual address collision with a CPU virtual address is reduced or eliminated.

10. The address allocation process of Concept 8 wherein the VA on the CPU is blocked and the VA chunk is mapped to the physical pages on GPU.

11. The address allocation process of Concept 8 wherein the CPU VA space and GPU VA space are disjoint.

12. The address allocation process of Concept 8 wherein a new CPU VA is reallocated if the GPU VA mapping fails.

13. The address allocation process of Concept 8 wherein an allocator maintains an internal heap of ranges it has reserved on the CPU and the heap represents the GPU allocations and includes the VA address.

14. The address allocation process of Concept 8 wherein an allocator or the runtime determines if a virtual address is a GPU allocation or a CPU allocation by looking up the heap.

15. A tangible computer readable medium including instructions for directing a processor in the implementation of an address allocation process comprising:
   allocating physical memory pages;
   allocating a virtual address associated with a first component; and
   mapping the allocated physical pages to the virtual address allocated in association with the first component, wherein the mapping of the virtual address allocated in association with the first component is performed by an element associated with the second component.

16. The tangible computer readable medium of concept 15 wherein the first component virtual address space is reserved on demand.

17. The tangible computer readable medium of concept 15 wherein a virtual address for the first component is tracked or recorded.

18. The tangible computer readable medium of concept 15 wherein the first component is a central processing unit (CPU) and the second component is a graphics processing unit (GPU).

19. The tangible computer readable medium of concept 15 further comprising a deallocation process including:
   unmapping a portion of the physical pages from a second component using a second component driver;
   calling to an unmap function to deallocate a first component reservation; and
   freeing the portion of the physical memory pages.

20. The tangible computer readable medium of concept 15 wherein pointer collision is avoided by an operating system (OS) function allocating the physical memory pages associated with a GPU without allocating physical pages associated with a CPU.

21 A method comprising:
   a) use the OS function to allocate the physical memory pages;
   b) allocate only the VA on the CPU and record the VA returned by the map function.
   c) map the physical pages allocated in step (a) on the GPU; and
   d) return the VA obtained in the step (a) to the user.

22 A system comprising:
   a CPU processor;
   a GPU processor coupled to the CPU processor;
   wherein
   a) OS function is used to allocate the physical memory pages;
   b) allocate only the VA on the CPU and record the VA returned by the map function.
   c) map the physical pages allocated in step (A) on the GPU; and
   d) return the VA obtained in the step (B) to the user.

23 A method comprising:
   establishing a unified virtual memory including allocating physical memory associated with a central processing unit and physical memory associated with graphics processing unit;
   suspending temporarily a correspondence between a central processing unit physical address space and a graphics processing unit physical address space performing a temporary isolation process, the suspending being temporarily in effect while a debugging operation is performed; and
   updating information in the graphics processing unit physical address space to match information in the central processing unit physical address space.

24 The method of Concept 23 further comprising accessing information included in the unified virtual memory from a debugger.

25 The method of Concept 24 wherein accessing unified memory from a debugger includes:
   utilizing a front end of the debugger to determine if valid information is available from a first component; and
   utilizing a back end of the debugger to determine if valid information is available from a second component, the back end of the debugger is utilized when the front end of the debugger receives an indication valid information is not available from the first component.

26 A method comprising:
   performing a memory allocation process;
   performing a temporary isolation process; and
   performing an update process.

27 A system comprising:
   a CPU processor;
   a GPU processor coupled to the CPU processor;
   wherein operations include:
   performing a memory allocation process
   performing a temporary isolation process;
   performing an update process.

28 A method of accessing unified memory from a debugger comprising:
   utilizing a front end of the debugger to determine if valid information is available from a first component;
   utilizing a back end of the debugger to determine if valid information is available from a second component, the back end of the debugger is utilized when the front end of the debugger receives an indication valid information is not available from the first component.

29 The method of Concept 28 wherein the determining if valid information is available from the first component includes making an API call 30 The method of Concept 28 wherein the API call is a ptrace call 31 The method of Concept 28 wherein the first component is a CPU and the second component is GPU.

32 The method of Concept 28 wherein the back end of the debugger accesses the virtual memory via an API call.

33 The method of Concept 28 wherein the process the back end of the debugger accesses the virtual memory includes a device driver creating a mapping by using a window and shifting and creating a CPU to VA mapping, then the device driver reads or writes the memory itself and then send the content back to the debugger.

34 The method of Concept 28 wherein the process the back end of the debugger accesses the virtual memory a device driver creating a mapping by using a window and shifting and creating a CPU to VA mapping and the debugger backend accesses the VA space.

35 A method comprising:
performing a process to establish managed memory associated with a single pointer; and
performing a process of automatically managing access associated with the pointer across multiple processor and memories.

36 The method of Concept 35 comprising reserving one or more regions from a first processor's virtual address space and reserving one or more regions from a second processor's virtual address space, wherein said regions are reserved for operations associated with a single pointer.

37 The method of Concept 35 comprising automated management of accesses to data associated with said single pointer in which data coherency and concurrency are automatically maintained.

38 A system comprising:
a first processor for processing information; and
a second processor for processing information;
wherein accesses associated with a single pointer are automatically managed across multiple memories associated with said first processor and said second processor.

39 The system of Concept 38 wherein said accesses associated with said single pointer are automatically managed back and forth between said first processor and said second processor according to which processor is attempting to access data associated with the pointer.

40 A method comprising:
performing a process to establish managed memory associated with a single pointer; and
performing a process of automatically managing access associated with the pointer across multiple processor and memories.

41 The method of Concept 40 comprising utilizing peer to peer across multiple processors.

42 A system comprising:
a first processor for processing information; and
a second processor for processing information coupled to said first processor;
a third processor for processing information coupled to said first processor, wherein said second and said third processor are the same type of processor;
wherein accesses associated with a single pointer are automatically managed across multiple memories associated with said first processor and said second processor and said third processor.

43. A method for managing concurrently processing parallel processing streams, the method comprising:
allocating a portion of memory in a graphics processor unit (GPU); and
attaching a first parallel processing stream to the portion of allocated memory, wherein a pointer for accessing data in the allocated memory is accessed by only the first parallel processing stream and is independent of any other parallel processing stream.

44. The method of Concept 43, wherein a parallel processing stream comprises two or more kernels that are serially launched in the GPU.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents. The listing of steps within method claims do not imply any particular order to performing the steps, unless explicitly stated in the claim.

The invention claimed is:

1. An address allocation process comprising:
allocating by a first processing unit, a physical memory address, of a physical address space of a second processing unit, to the second processing unit;
allocating, by the first processing unit, a virtual address, within a reserved virtual address space of the first processing unit, to the second processing unit, a physical address space of the first processing unit not being allocated to the virtual address; and
causing a processor driver of the second processing unit to map the allocated physical memory address to the virtual address.

2. The address allocation process of claim 1 wherein an operating system (OS) function is used to allocate the physical memory address.

3. The address allocation process of claim 1 wherein actual physical pages associated with the first processing unit are not allocated to the virtual address.

4. The address allocation process of claim 1 wherein the second processing unit is a GPU.

5. The address allocation process of claim 1 wherein the processor driver is a GPU driver.

6. The address allocation process of claim 1 wherein the virtual address allocated to the second processing unit is returned to the user.

7. The address allocation process of claim 1 wherein virtual addresses in the reserved virtual address space of the first processing unit are inaccessible by the second processing unit.

8. A system comprising:
a central process unit (CPU);
a graphics processing unit (GPU) coupled to the central processing unit; and
a memory for storing information utilized by the GPU and CPU, wherein a virtual address in a reserved CPU (VA-CPU) virtual address space is allocated to a pointer, a physical address in a GPU (PA-GPU) physical memory space is allocated for storing information associated with the pointer, and the VA-CPU is mapped to the PA-GPU, wherein the mapping of the VA-CPU to the PA-GPU is performed by a driver of the GPU, and wherein a CPU physical memory space is not allocated to the virtual address.

9. The address allocation system of claim 8 wherein possibility of a GPU virtual address collision with a CPU virtual address is reduced or eliminated.

10. The address allocation system of claim 8 wherein the VA-CPU is blocked for other use when the VA-CPU is mapped to the PA-GPU.

11. The address allocation system of claim 8 wherein the reserved CPU virtual address space and a GPU virtual address space are disjoint.

12. The address allocation system of claim 8 wherein a new virtual address is allocated if the VA-CPU fails to be mapped.

13. The address allocation system of claim 8 wherein an allocator maintains an internal heap of ranges it has reserved on the CPU and the heap represents the GPU allocations and includes the virtual address.

14. The address allocation system of claim 8 wherein an allocator or the runtime determines if a virtual address is a GPU allocation or a CPU allocation by looking up a heap.

15. A tangible computer readable medium including instructions for the implementation of an address allocation process comprising:
 allocating, by a first processing unit, a physical memory address, of a physical address space of a second processing unit, to the second processing unit;
 allocating, by the first processing unit, a virtual address, within a reserved virtual address space of the first processing unit, to the second processing unit, a physical address space of the first processing unit not being allocated to the virtual address; and
 causing a processor driver of the second processing unit to map the allocated physical memory address to the virtual address.

16. The tangible computer readable medium of claim 15 wherein the reserved virtual address space of the first processing unit is reserved on demand.

17. The tangible computer readable medium of claim 15 wherein the reserved virtual address space of the first processing unit is tracked or recorded.

18. The tangible computer readable medium of claim 15 wherein the first processing unit is a central processing unit (CPU) and the second processing unit is a graphics processing unit (GPU).

19. The tangible computer readable medium of claim 15 further comprising a deallocation process including:
 unmapping the physical memory address from the second processing unit using the processor driver;
 calling to an unmap function to deallocate a first processor unit reservation; and
 freeing the physical memory address.

20. The tangible computer readable medium of claim 15 wherein pointer collision is avoided by an operating system (OS) function allocating physical memory pages associated with a GPU without allocating physical pages associated with a CPU.

* * * * *